United States Patent [19]

Wissmann

[11] Patent Number: 5,059,638

[45] Date of Patent: Oct. 22, 1991

[54] POLYESTER RESIN FILLED WITH LOW-ADHESIVE GLASS FIBER

[75] Inventor: Rolf B. Wissmann, Vesenaz, Switzerland

[73] Assignee: E. I. Du Pont de Nemours and Company, Wilmington, Del.

[21] Appl. No.: 434,863

[22] Filed: Nov. 8, 1989

[30] Foreign Application Priority Data

Dec. 20, 1988 [EP] European Pat. Off. ........ 88312064.4

[51] Int. Cl.$^5$ .......................... C08K 9/04; C08K 7/14
[52] U.S. Cl. .................................... 523/205; 524/513; 524/600; 524/605
[58] Field of Search ................ 523/209; 524/513, 600, 524/605

[56] References Cited

U.S. PATENT DOCUMENTS

| | | | |
|---|---|---|---|
| 3,651,014 | 5/1972 | Witsiepe | 260/75 R |
| 3,766,146 | 10/1973 | Witsiepe | 260/75 R |
| 3,907,926 | 9/1975 | Brown et al. | 260/860 |
| 4,568,712 | 2/1986 | Van Abeelen et al. | 524/267 |
| 4,769,273 | 9/1988 | Hoeschele et al. | 428/215 |

FOREIGN PATENT DOCUMENTS

0009950  8/1980  European Pat. Off. .

*Primary Examiner*—Lewis T. Jacobs

[57] ABSTRACT

A glass or mineral fiber-filled polyester resin comprising a polyetherester or poly(etherimide ester) or a blend of one or both of a polyetherester or a poly(etherimide ester) with poly(butylene terephthalate) or poly(ethylene terephthalate). The composition must not have a matrix phase of poly(butylene terephthalate) or poly(ethylene terephthalate). The fiber has substantially no adhesion for the polyester base resin. The glass or mineral fibers effectively control the coefficient of linear thermal expansion of the polymer blend. The low adhesive fiber does not result in the reduction in toughness associated with conventional reinforcing adhesive fiber (which is coated with a coupling agent for the resin).

13 Claims, 6 Drawing Sheets

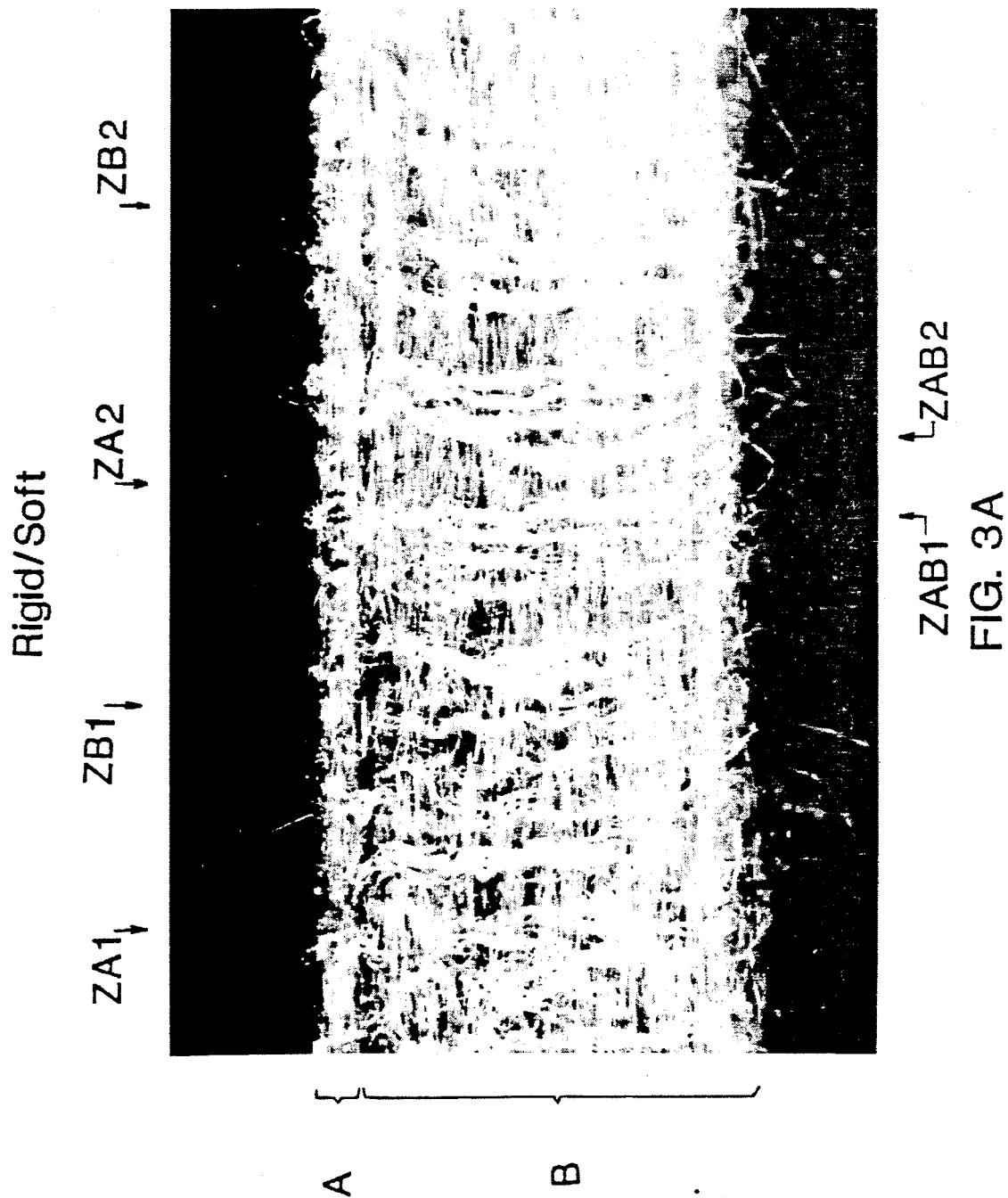

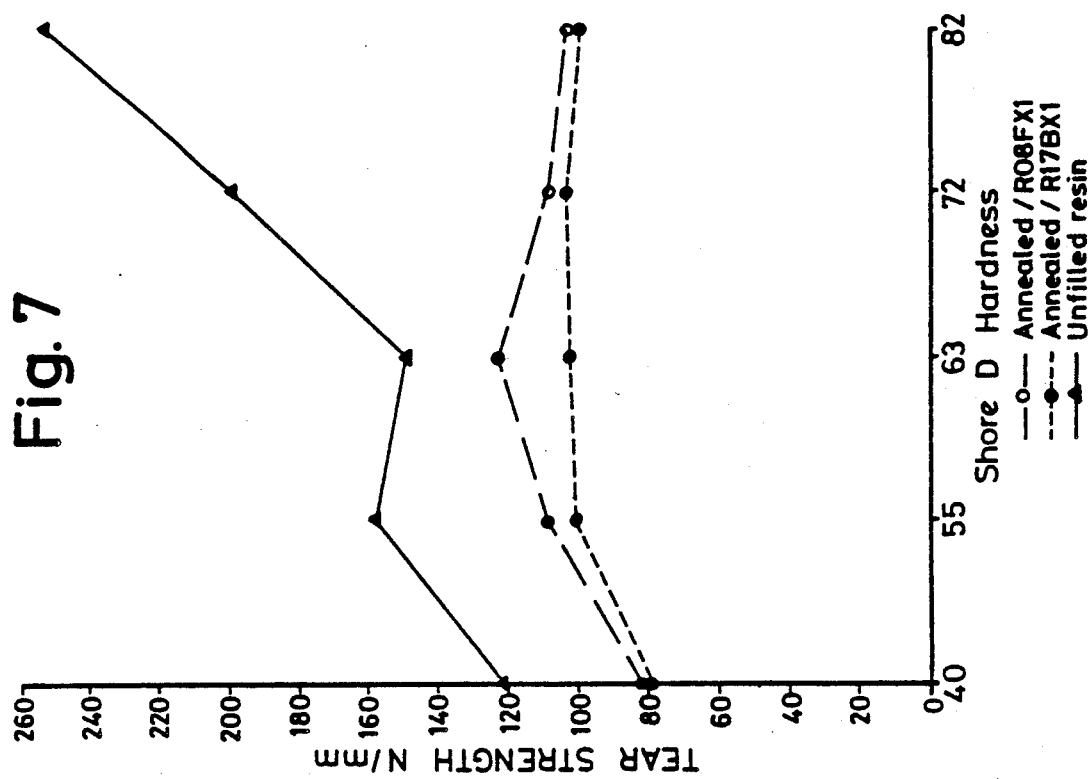
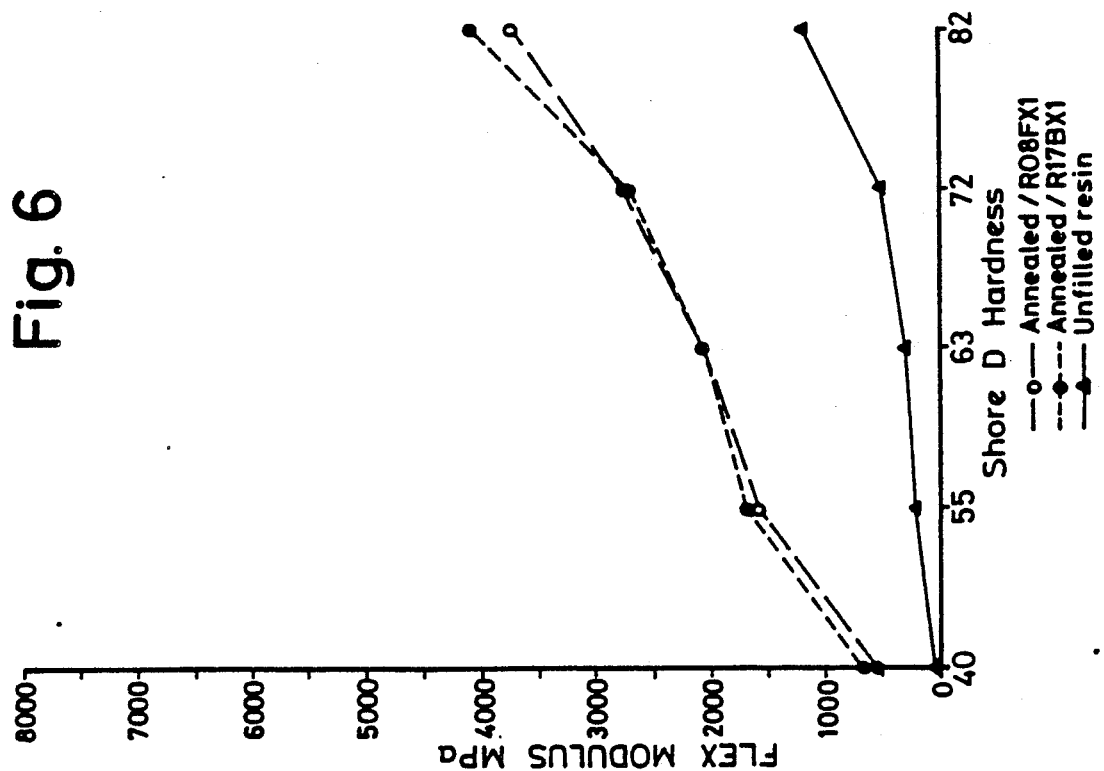

POLYESTER RESIN FILLED WITH LOW-ADHESIVE GLASS FIBER

BACKGROUND OF THE INVENTION

The present invention relates to glass fiber-filled polyester resins and, more particularly, to the use in polyester resins of glass fibers with low adhesion for the resin to reduce the coefficient of linear thermal expansion of the polyester resin.

It is known to make exterior automotive parts, for example side cladding and rocker panels, out of moulded, glass fiber-reinforced thermoplastic polymer. Thermoplastic polyesters such as poly(butylene terephthalate)(PBT) or poly(ethylene terephthalate)(PET), for example, are stiff enough to be used as the thermoplastic polymer in such applications but are not sufficiently tough at low temperatures. Addition of thermoplastic elastomeric polyesters, for example a polyetherester (PEE), increases toughness. Poly(etherimide)esters are known to have properties very similar to polyetheresters and may be used in place of some or all of the polyetherester toughener. The polymer blend itself has a coefficient of linear thermal expansion (CLTE) which is too high for the demanding requirements of exterior automotive parts and glass fiber is incorporated in the resin to reduce CLTE.

One such fiber-reinforced polyester resin is a thermoplastic polyester composition of which the basic components are a crystalline segmented block copolymer with elastomeric soft segments and high melting crystalline polyester hard segments (a thermoplastic elastomeric polyester) and a thermoplastic, high modulus, high melting crystalline polyester. The thermoplastic elastomeric polyester used is a polyetherester containing poly(butylene terephthalate) (PBT) hard segments and polytetramethyleneetherglycol (PTMEG) soft segments. The high modulus, high melting cyrstalline polyester is PBT.

It is well known that the fiber in polyester blends must act as a reinforcement by the use of an appropriate coupling agent on the glass fiber to strongly adhere the fiber to the polyester. However, adequate reinforcement, while it reduces CLTE, results in a significant reduction in toughness as measured by elongation at break, Rheometrics impact strength or the falling dart impact test. The notched Izod impact test is considered to be not of great sensitivity in studies on fiber-filled resins, particularly because most of the fibers are aligned perpendicular to the impact pendulum.

Also commercially important is the surface quality of polyester compositions used in exterior automotive applications and the ability to paint exterior parts efficiently. The surface appearance of the exterior parts must be maintained over time. "Paintability" requires heat sag resistance whereby less support of the parts is needed during painting. Surface quality requires that fiberrelated surface defects should be avoided; examples of such defects are weld lines, waviness and warpage. Fiber-related surface defects are exacerbated by increasing glass fiber level.

The present invention aims to provide fiber filled resins which have a reduced CLTE as compared with the unfilled resin but do not have the reduction in toughness associated with previous fiber-filled resins.

SUMMARY OF THE INVENTION

The present invention is based on the unexpected finding that the replacement of reinforcing fibers in certain polyester resins with non-reinforcing fibers does not result in a significant loss of reduction in CLTE and yet does significantly ameliorate the loss in toughness attendant upon use of reinforcing fibers.

The invention provides a fiber-filled polyester resin, comprising:

a polyetherester, a poly(etherimide)ester or a blend of both, or a blend of one or both of a polyetherester or a poly(etherimide)ester with a poly(butylene terephthalate) or poly(ethylene terephthalate) other than a blend having a matrix phase of poly(butylene terephthalate), poly(ethylene terephthalate) or both; and glass or mineral fibers that do not substantially adhere to the resin, the fiber-filled resin having an elongation at break when injection moulded substantially greater than that of the same resin when filled with reinforcing glass or mineral fiber that adhere to the resin.

DESCRIPTION OF PREFERRED EMBODIMENT

The base polymer of the invention is a polyetherester (PEE) or a poly(etherimide)ester (PEI). PEI is known to have similar properties to PEE and is often used as an alternative to PEE; PEI may therefore be referred to as a "PEE equivalent". PEE and PEI share the feature of comprising elastomeric soft segments (polyether or polyetherimide segments) and crystalline hard segments (polyester segments). A blend of PEE and PEI may be used as the base polymer of the invention.

The PEE, PEI or PEE/PEI blend may be blended with poly(butylene terephthalate). Some or all of the PBT may be replaced with PET.

The base resin may, of course, include other components, for example additives, such as carbon black or antioxidant, or glass flakes to reduce fiber anisotropy. The nature and quantity of the other components will be selected so as not to alter the properties of the fiber-filled resin to make it unsuitable for the proposed application.

The fiber used in the base resin is at least in part non-reinforcing. Reinforcing fiber is coated with coupling agent to strongly adhere to the base resin and is a term of art which will require no explanation to the reader. Reinforcing fiber increases the tensile strength and flex modulus of the base resin. As used herein, "non-reinforcing" fiber refers to fiber which does not adhere to the resin sufficiently to obtain substantially full reinforcement. Thus, the fiber is substantially non-adhesive for the resin. The fiber is usually, and preferably, glass but mineral fibers can also be used in place of some or all of the glass fiber.

The use of non-reinforcing fiber reduces the tensile strength of the resin, at least as compared with reinforced resin. We have found non-adhesive fiber to reduce the tensile strength to below that of the unfilled resin. The tensile strength may be improved by increasing the adhesiveness of the fiber and/or by incorporating reinforcing as well as non-reinforcing fiber in the resin, albeit at the expense of reduced toughness. The tensile strength of the fiber-filled composition is therefore a measure of reinforcement. However, tensile strength is also increased by increasing the resin hardness or decreasing the amount of non-adhesive filler. As explained below, a critical degree of adhesion cannot be specified. However, experiments indicate that the use of non-adhesive or low adhesive fibers in accordance with the invention reduces tensile strength by at least 15 or 20% in the flow direction of a moulded sample, as compared with a corresponding reinforced resin. The compositions we have prepared for automotive parts usually have an absolute tensile strength of no more than about 25 MPa and often of no greater than about 22 MPa in the flow direction of a moulded sample; given the different factors which affect tensile strength, the importance of these figures should not be overemphasised.

It has been found by transmission electron microscopy that the desired improvement in toughness is not obtained if the resin has a matrix phase of PBT or PET. Thus such resins are excluded from the invention. As the skilled person will know, which polymer forms the matrix depends on the relative volumes and viscosities of the polymers.

The critical property of the fiber-filled resin of the invention is that, when injection moulded, it has significantly greater elongation at break than the same base resin when filled exclusively with reinforcing fiber. Elongation at break is widely recognised as a good indirect measure of toughness. A number of different toughness tests are known and a feel for overall toughness may be determined by ascertaining the results of different tests. However, we regard elongation at break as a particularly useful measure of toughness and, for example, automobile manufacturers do specify minimum elongations at break for exterior automotive parts. Other important tests for toughness include the CEAST impact test and rheometrics impact test.

The degree of elongation is determined by a complex interaction of different factors or parameters. Two important factors are the proportion of fiber (the less the amount of fiber, the greater is the elongation) and the hardness of the PEE or PEI (the harder the polymer, the less is the elongation). Of course, an increased degree of fiber adhesion or proportion of reinforcing fibers reduces elongation. In a blend with PBT and/or PET, the relative viscosities and proportions of, on the one hand, the PBT/PET and, on the other hand, the PEE/PEI also play a role in determining elongation. Thus, an increase in the viscosity or amount of PBT and/or PET increases the elongation at break.

The increase in elongation achieved by the invention as compared with the corresponding reinforced resin cannot be specified precisely. The aim of the invention is to provide a significant increase in elongation and the skilled person will be able to determine whether an increase in elongation is functional or useful for any particular application. As a guide, however, the present invention can readily achieve an elongation at break twice that of a comparative reinforced resin, and an increase of five, eight or even ten times is often achieved.

An absolute elongation at break of 70% or more is commonly obtained in the flow direction of a moulded composition of the invention but it is more preferred to have an elongation of at least 250% or 300%. For some applications, an elongation of 60% might be satisfactory.

In view of the combination of factors which determine elongation at break, a unique set of parameters required to achieve any specific elongation or comparative increase in elongation cannot be given. Nevertheless, experiments indicate that when the Shore D hardness of the PEE or PEI exceeds 70 or 75 it is difficult to achieve a large increase in elongation vis-a-vis the reinforced comparison; for many applications a hardness of no more than 60 to 65 D will probably be appropriate. For optimum results a hardness from in the order of 40 D up to 55 D (e.g. 35 to 45 D) is preferred. Shore D hardness may be measured in accordance with DIN 53505 or ISO 868.

We have obtained useful results using fiber contents of up to 25% based on the weight of the whole fiber filled composition. It is preferred not to use a higher proportion of fiber. The most preferred amount of fiber is from 15 to 20 wt % and generally no less than about 10 wt % will be used. These fiber contents are not critical and, for example, will depend of the hardness of the PEE or PEI or the PBT/PET:PEE/PEI ratio. In a PBT or PET containing blend, less than 10% could be used so long as more PBT/PEI was included to counteract the loss in stiffness (assuming that the same stiffness was required).

In the case of a blend with PBT or PET, it has been found that useful results tend not to be obtained if the PBT/PET:PEE/PEI ratio exceeds 60:40 or 65:35.

The nature of the components and their relative proportions for any application may be optimised by trial and error experiment and using the guidance herein in conjunction with the knowledge of the skilled person. For any given application, an appropriate balance of properties is required and improving one property may involve reducing another. Thus, improving fiber adhesion increases tensile strength but reduces toughness.

The present invention is further described by way of example only with reference to the accompanying drawings, in which:

FIG. 1 is a Scanning Electron Microscope (SEM) picture of a prior art resin filled with reinforcing glass fiber;

FIG. 2 is an SEM picture of a resin of the invention filled with a substantially non-adhesive fiber;

FIG. 6 is a graph showing the variation of flex modulus with polymer hardness of unfilled PEE, PEE filled with reinforcing fiber and PEE filled with non-reinforcing fiber;

FIG. 7 is a graph showing the variation of tear strength with polymer hardness of unfilled PEE, PEE filled with reinforcing fiber and PEE filled with non-reinforcing fiber;

Figure 9:
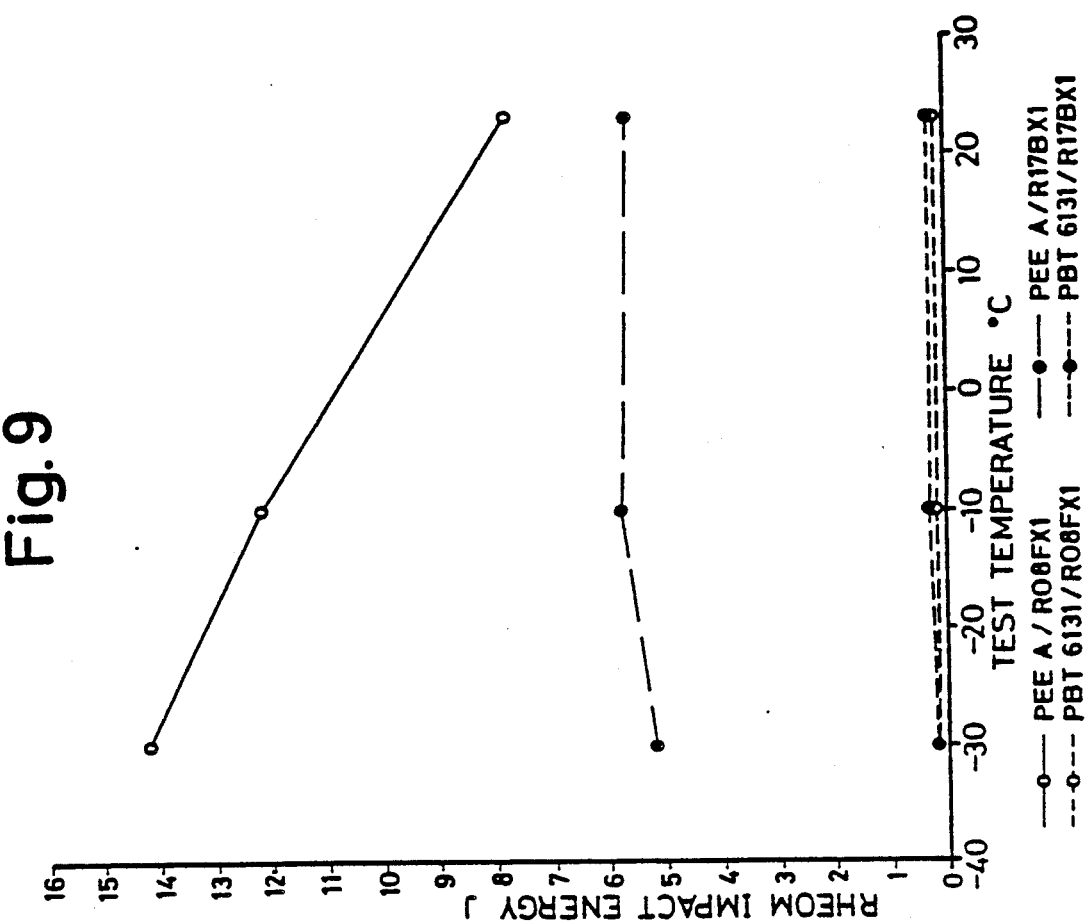
Figure 8:
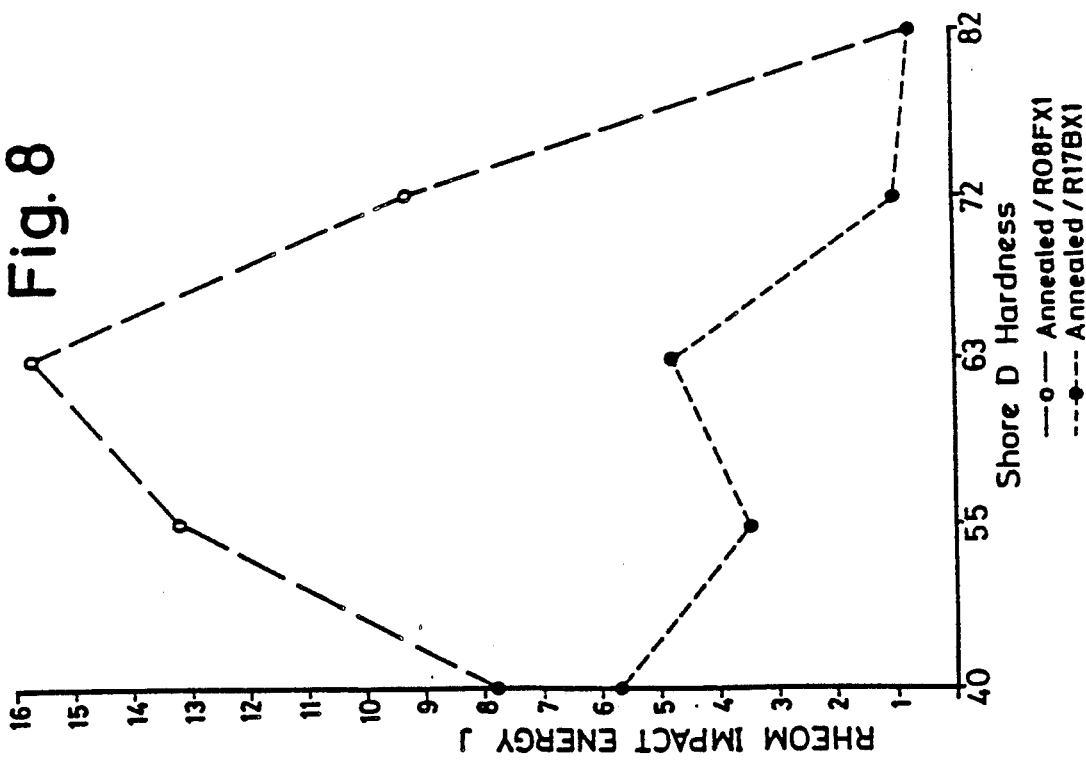

FIG. 8 is a graph showing the variation at 23° C. of rheometrics impact energy with polymer hardness of PEE filled with reinforcing fiber and PEE filled with nonreinforcing fiber; and FIG. 9 is a graph showing the variation of rheometrics impact energy with temperature of PEE filled respectively with reinforcing and non-reinforcing fiber and of PBT filled respectively with reinforcing and non reinforcing fiber.

The components of the fiber-filled the invention will now be described by way of non-limiting example.

The polyetherester generally comprises a multiplicity of recurring intralinear long chain and short chain ester units connected head-to-tail through ester linkages.

The long chain ester units are represented by the structure:

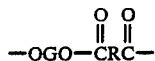
(a)

and the short chain ester units are represented by the structure:

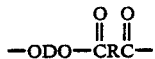
(b)

wherein:

G is a divalent radical remaining after removal of terminal hydroxy groups from a long chain polymeric glycol, i.e. a glycol having a molecular weight of above-about 400 and preferably of no more than about 6,000, the long chain glycol generally being a poly(alkylene oxide) glycol;

R is a divalent radical remaining after removal of carboxyl groups from a dicarboxylic acid having a molecular weight of less than about 300; and D is a divalent radical remaining after removal of hydroxyl groups from a low molecular weight diol, i.e. a dial having a molecular weight of less than about 250.

If desired, the polyetherester may comprise a plurality of different long chain glycol residues, dicarboxylic acid residues and/or low molecular weight diol residues. The polyetherester consists essentially of the long and short chain ester units. It will be understood, therefore, that it may contain other units in an amount small enough not to significantly detract from the properties of the polymer.

The long chain ester units (a) are the reaction product of a long-chain glycol with a dicarboxylic acid. The long-chain glycols are poly(alkylene oxide)glycols having terminal (or as nearly terminal as possible) hydroxy groups and a molecular weight of from about 400 to, preferably, 6,000.

Representative long-chain glycols are poly(ethylene oxide)glycol, poly (1,2-and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as 3-methyltetrahydrofuran. Poly(tetramethylene oxide)-glycol is most preferred.

The short-chain ester units (b) are low molecular weight compounds or polymer chain units having molecular weights of less than about 550. They are made by reacting a low molecular weight diol (below about 250) with a dicarboxylic acid to form ester units represented by formula (b) above.

Included among the low molecular weight diols which react to form short-chain ester units are aliphatic, cycloaliphatic, and aromatic dihydroxy compounds. Preferred are diols with 2-15 carbon atoms such as ethylene, propylene, tetramethylene, pentamethylene, 2,2-dimethyltrimethylene, hexamethylene and decamethylene glycols, dihydroxy cyclohexane, cyclohexane dimethanol, resorcinol, hydroquinone, 1,5-dihydroxy naphthalene etc. Especially preferred are aliphatic diols containing 2-8 carbon atoms. Included among the bis-phenols which can be used are bis(p-hydroxy)diphenyl, bis(p-hydroxyphenyl)methane and bis(p-hydroxyphenyl) propane. Equivalent ester-forming derivatives of diols are also useful (e.g. ethylene oxide or ethylene carbonate can be used in place of ethylene glycol). The term "low molecular weight diols" as used herein should be construed to include such equivalent ester-forming derivatives; provided, however, that the molecular weight requirement pertains to the diol only and not to its derivatives. 1,4-butanediol is most preferred, although 1,4- butenediol may also be used. If a mixture of diols is used, then 1,4-butanediol preferably predominates, i.e. forms more than 50 mol % of the mixture.

The dicarboxylic acids are generally aliphatic, cycloaliphatic, or aromatic dicarboxylic acids having a molecular weight of less than about 300. The term "dicarboxylic acids", as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight of greater than 300 or an acid equivalent of a dicarboxylic acid having a molecular weight of greater than 300 are included provided the acid has a molecular weight of below about 300. The dicarboxylic acids can contain any substituent groups or combinations which do not substantially interfere with the copolyester polymer formation and use of the polymer of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and, where more than one ring is present, they can be joined by aliphatic or aromatic divalent radicals or divalent radicals such as —O—or —SO$_2$—.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succunic acid, carbonic acid, oxalic acid, azelaic acid, diethylmalonic acid, allylmalonic acid, 4-cyclohexene-1,2-dicarboxylic acid, 2-ethylsuberic acid, 2,2,3,3-tetramethylsuccinic acid, cyclopentanedicarboxylic acid, decahydro-1,5-naphthalenedicarboxylicacid, 4,4'-bicyclohexyldicarboxylic acid, decahydro-2,6-naphthalene dicarboxylic acid, 4,4'-methylenebis(cyclohexane carboxylic acid), 3,4-furan dicarboxylic acid, and 1,1-cyclobutane dicarboxylic acid. Preferred aliphatic acids are cyclohexane-dicarboxylic acids and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl) methane, p-oxy(p-carboxyphenyl)benzoic acid, ethylene-bis (p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and $C_1$-$C_{12}$ alkyl and ring substitution derivatives thereof, such as halo, alkoxy, and aryl derivatives. Hydroxyl acids such as p($\beta$-hydroxyethoxy)benzoic acid can also be used providing an aromatic dicarboxylic acid is also present.

Aromatic dicarboxylic acids are an especially preferred class for preparing the copolyetherester polymers of this invention. Among the aromatic acids, those with 8-16 carbon atoms are preferred, particularly the phenylene dicarboxylic acids, i.e., phthalic, terephthalic and isophthalic acids and their derivatives, especially their dimethyl esters.

It is preferred that at least 50% of the short segments are identical and that the identical segments form a homopolymer in the fiber-forming molecular weight range (molecular weight > 5000) having a melting point of at least 150° C. and preferably greater than 200° C. Copolyetheresters meeting these requirements exhibit properties such as tensile strength and tear strength at a useful level. Polymer melting points are conveniently determined by a differential scanning calorimetry.

The copolyetheresters may be made by a conventional ester interchange reaction. A preferred procedure involves heating the dicarboxylic acid, e.g. dimethyl ester of terephthalic acid, with a long chain glycol, e.g., poly(tetramethylene oxide)glycol having a molecular weight of about 600-2,000, and a molar excess of diol, e.g. 1,4-butanediol, in the presence of a catalyst at about 150°-260° C. and a pressure of 0.5 to 5 atmospheres, preferably ambient pressure, whilst distilling off methanol formed by the ester interchange. Depending on temperature, catalyst, glycol excess, and equipment, this reaction can be completed within a few minutes e.g. 2 minutes to a few hours, e.g. 2 hours.

At least about 1.1 mole of diol should be present for each mole of acid, preferably at least about 1.25 mole of diol for each mole of acid. The long chain glycol should be present in an amount of about 0.0025 to 0.85 mole per mole of dicarboxylic acid, preferably 0.01 to 0.6 mole per mole of acid.

This procedure results in the preparation of a low molecular weight prepolymer which can be carried to the high molecular weight copolyetherester of this invention by the procedure described below. Such prepolymers can also be prepared by a number of alternative esterification or ester interchange processes.

The prepolymer is then carried to high molecular weight by distillation of the excess of short chain diol. This process is known as "polycondensation".

Additional ester interchange occurs during this polycondensation which serves to increase the molecular weight and to randomize the arrangement of the copolyetherester units. Best results are usually obtained when this final distillation or polycondensation is run at less than about 5 mmHg (6.67 kPa) pressure and about 200°-270° C. for less than about two hours e.g. 0.5 to 1.5 hours.

Most practical polymerization techniques rely upon ester interchange to complete the polymerization reaction. In order to avoid excessive hold time at high temperatures with possible irreversible thermal degradation, a catalyst for the ester interchange reaction should be employed. While a wide variety of catalysts can be employed, organic titanates such as tetrabutyl titanate used alone or in combination with magnesium or calcium acetates are preferred. Complex titanates, such as $Mg[HTi(OR)_6]_2$, derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

The catalyst should be present in an amount of 0.005 to 0.2% by weight based on total reactants.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight diols, for example, butane diol in terphenyl, are conveniently removed during high polymerization by azeotropic distillation.

The dicarboxylic acids or their derivatives and the polymeric glycol are incorporated into the final product in the same molar proportions as are present in the ester interchange reaction mixture. The amount of low molecular weight diol actually incorporated corresponds to the difference between the moles of diacid and polymeric glycol present in the reaction mixture. When mixtures of low molecular weight diols are employed, the amounts of each diol incorporated are largely a function of the amounts of the diols present, their boiling points, and relative reactivities. The total amount of diol incorporated is still the difference between moles of diacid and polymeric glycol.

Polyetheresters of the aforegoing type and their preparation are described in U.S. Pat. No. 3907926, which is incorporated herein by reference.

Polyesters of the aforegoing type are also described in U.S. Pat. No. 3766146, which is incorporated herein by reference. A particular embodiment of such polyesters is described in U.S. Pat. No. 3651014, also incorporated herein by reference. The polymer of U.S. Pat. No. 3651014, which may be used in the present invention, comprises long chain ester units of at least one of the following structures:

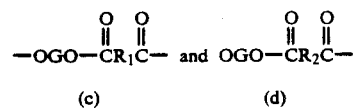

(c)          (d)

and short chain ester units represented by at least two of the following structures:

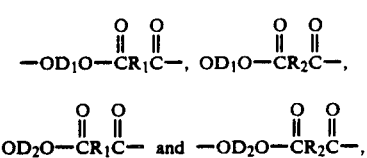

wherein
G is as defined above, and $R_1$ and $R_2$, and $D_1$ and $D_2$ are, respectively, different groups falling within the above definitions of R and D.

These polyesters are prepared by polymerizing with each other (a) one or more dicarboxylic acids or their equivalents (their esters, or ester-forming derivatives, e.g. acid chlorides or anhydrides), (b) one or more long chain glycols and (c) one or more low molecular weight diols, provided that two or more dicarboxylic acids or their equivalents are used when only one low molecular weight diol is used and that two or more low molecular weight diols are used when only one dicarboxylic acid or its equivalent is present.

The poly(etherimide)ester comprises the reaction product of one or more diols, one or more dicarboxylic acids and one or more poly(oxyalkylene imide)diacids.

The poly(etherimide)esters used in the present invention may be prepared by conventional processes from (a) one or more diols, (b) one or more dicarboxylic acids and (c) one or more poly(oxyalkylene imide)diacids. Preferred poly(etherimide)esters can be prepared when the diol (a) is one or more $C_2-C_{15}$ aliphatic and/or cycloaliphatic diols, when the dicarboxylic acid (b) is one or more $C_4-C_{16}$ aliphatic, cycloaliphatic and/or aromatic dicarboxylic acids or ester derivatives thereof and when the poly(oxyalkylene imide) diacid (c) is derived from one or more polyoxyalkylene diamines and one or more tricarboxylic acid compounds containing two vicinal carboxyl groups or an anhydride group and an additional carboxyl group.

Suitable diols (a) for use in preparing the poly(etherimide)ester elastomers include saturated and unsaturated aliphatic and cycloaliphatic dihydroxy compounds as well as aromatic dihydroxy compounds. These diols preferably have low molecular weights, i.e. have a molecular weight of about 250 or less. When used herein, the terms "diols" and "low molecular weight diols" should be construed to include equivalent ester forming derivatives thereof, provided, however, that the molecular weight requirement pertains to the diol only and not to its derivatives. Exemplary ester forming derivatives are the acetates of the diols as well as, for example, ethylene oxide or ethylene carbonate for ethylene glycol.

Preferred diols include those discussed above in connection with group D.

Where more than one diol is employed, it is preferred that at least about 60 mole %, based on the total diol content, be the same diol, most preferably at least 80 mole The preferred compositions are those in which 1,4-butanediol is present in a predominant amount, most preferably when 1,4-butanediol is the only diol used.

Dicarboxylic acids (b) which are used to make the poly(etherimide)ester elastomers are aliphatic, cycloaliphatic, and/or aromatic dicarboxylic acids. Preferably, these acids have low molecular weight, i.e. have a molecular weight of less than about 300; however, higher molecular weight dicarboxylic acids, especially dimer acids, may be used.

Representative and preferred dicarboxylic acids are described above in connection with group R.

Where mixtures of dicarboxylic acids are employed, it is preferred that at least about 60 mole %, preferably at least about 80 mole %, based on 100 mole % of dicarboxylic acid (b) be the same dicarboxylic acid or ester derivative thereof. The preferred compositions are those in which dimethyl terephthalate is the predominant dicarboxylic acid, most preferably when dimethyl terephthalate is the only dicarboxylic acid.

Poly(oxyalkylene imide)diacids (c) suitable for use herein include high molecular weight imide diacids wherein the number average molecular weight is greater than about 900, most preferably greater than about 1,200. They may be prepared by the imidization reaction of one or more tricarboxylic acid compounds containing two vicinal carboxyl groups or an anhydride group and an additional carboxyl group which must be esterifiable and preferably is nonimidizable with a high molecular weight polyoxyalkylene diamine. The high molecular weight polyoxyalkylene diamines used to prepare the poly(oxyalkylene imide)diacids generally have the formula $H_2N-G-NH_2$ where G is a divalent radical remaining after removal of hydroxyl groups of a long chain ether glycol having a molecular weight of from about 600–6,000 usually 900–4,000. The polyalkylene diamines are those usually having 2–5 carbon atoms in the alkylene group. Representative polyoxyalkylene diamines include polyoxyethylene diamine, polyoxypropylene diamine, polyoxybutylene diamine and the like.

A special class of poly(oxyalkylene imide)diacids is prepared by imidization of a high molecular weight poly(oxyalkylene)diamine with one or more tricarboxylic acid compounds containing two vicinal carboxyl groups or an anhydride group and an additional carboxyl group in the presence of pyromellitic anhydride. The number of equivalents of anhydride or vicinal carboxylic acid functions provided by the tricarboxylic acid compounds and pyromellitic anhydride should be the same as the total number of amine functions. Generally, the molar ratio of pyromellitic anhydride to the tricarboxylic acid compounds containing two vicinal carboxylic acid groups or an anhydride group and an acid group ranges from 0.33 to 1.5. This modification with pyromellitic anhydride increases the molecular weight of the poly(oxyalkylene imide)diacids and increases the hydrophilic nature of the resulting poly(etherimide)ester elastomer.

In general, preferred poly(oxyalkylene imide)diacids useful herein can be characterized by the following formula:

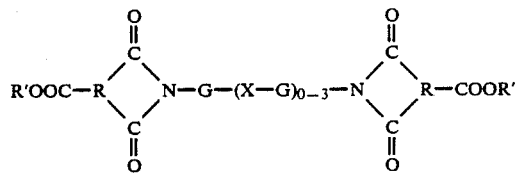

wherein each R is independently a trivalent organic radical, preferably a $C_2$ to $C_{20}$ aliphatic aromatic or cycloaliphatic trivalent organic radical; each R' is independently hydrogen or a monovalent aliphatic or cycloaliphatic radical containing 1–6 carbon atoms or an aromatic radical containing 6–12 carbon atoms, e.g., benzyl, most preferably R' is hydrogen; and G is the radical remaining after the removal of the terminal (or nearly terminal as possible) hydroxy groups of a long chain alkylene ether glycol having an average molecular weight of from about 600 to, preferably, about 6,000, and X is as follows:

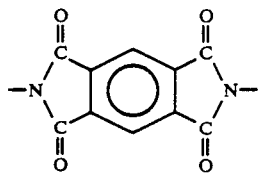

Briefly, the poly(oxyalkylene imide)diacids may be prepared by known imidization reactions including melt synthesis or by synthesising in a solvent system. Such reactions will generally occur at temperatures of from 100° C. to 300° C., preferably at from about 150° C. to about 250° C. while drawing off water or in a solvent system at the reflux temperature of the solvent or azeotropic (solvent) mixture.

For preparation of the poly(etherimide)ester elastomers, it is preferred that the diol be present in at least a molar equivalent amount, preferably a molar excess, most preferably 150 mole %, based on the moles of dicarboxylic acid (b) and poly(oxyalkylene imide) diacid (c) combined. Such molar excess of diol will have a beneficial effect on the polymerization kinetics and ensure complete reaction of the acid components.

Poly(etherimide)ester elastomers andtheir preparation are well known and more fully described in U.S. Pat. Nos. 4556688, 4556705 and 4769273, the disclosures of which are incorporated by reference.

It is preferred that a polyetherester be used in the composition of the inventive; rather than a poly(etherimide)ester. Most preferred are polyetheresters in which the dicarboxylic acid is terephthalic acid, optionally with a minor proportion (less than 50 mol % of the amount of terephthalic acid) of another phenylene dicarboxylic acid, e.g. isophthalic acid, the long chain glycol is poly(tetramethylene oxide)glycol having a molecular weight of from 600 to 2,000 and the short chain glycol is 1,4-butanediol. Poly(ethylene oxide)-glycol having a molecular weight of from 600 to 1,500 is another preferred long chain glycol and optionally up to about 30 mole percent, preferably 5-20 mole percent, of the terephthalate in the polymer may be replaced by phthalate or isophthalate.

Particularly preferred are copolyetheresters containing 30-50% by weight of short chain ester units derived from terephthalate of which a minor proportion may optionally be replaced by isophthalate and 1,4-butanediol.

The PBT or PET preferably has a weight average molecular weight of from 30,000 to 70,000, more preferably from 40,000 to 60,000. As the molecular weight or viscosity of the PBT or PET is increased, so the toughness of the composition increases. When large parts, for example rocker panels, are to be injection moulded, the PBT or PET should be chosen to have a low viscosity, otherwise difficulties might arise in filling the mould.

The glass or mineral fiber is non-reinforcing and is therefore not coated with coupling agent for the resin at a reinforcing level. PEE and PEI are polar polymers and the fiber may therefore be coated with an incompatible, non-polar polymer to prevent or reduce adhesion (unless the base resin contains a PBT or PET matrix phase). Suitable non-polar coating polymers are polyolefins grafted to maleic anhydride or an organosilane. The degree of adhesion may be modified by altering the amount of the covering resin; if sufficient polymer is used only to obtain partial coating of the fiber then improved adhesion will result, as the base resin can adhere to the exposed areas of fiber.

An exemplary substantially non-adhesive fiber for PEE or PEI is that sold under the designation "OCF R08FX1" by European Owens-Corning Fiberglass, Route de Charneux, B-4651 Battice, Belgium. Samples of the fiber are also available from Du Pont (U.K.) Limited, of Maylands Avenue, Hemel Hempstead, Hertfordshire, HP2 7DT, United Kingdom. Fiber R08FX1 is coated with a polyolefin resin grafted to a coupling agent to anchor the resin to the glass. More particularly, the coating on R08FX1 is a silane-grafted or maleic anhydride- grafted blend of polyethylene (PE) or other polyolefin and polyethylene/polypropylene (PE/PP) copolymer, in accordance with U.S. Pat. No. 4,659,752 (see Column 2 lines 57–61 and Column 6 lines 39–42). The preparation of the silane graft is described in U.S. Pat. No. 3,505,279. The above two U.S. patents are incorporated herein by reference. The organosilane or maleic anhydride serves to attach the polyolefin to the surface of the glass fibers.

According to U.S. Pat. No. 3,505,279, the coating polymer comprises a backbone of polyolefin with a molecular weight of from about 500 to about 50,000 with an organosilane coupled to each end of the backbone polymer. The grafted polymer is made by reacting a polyolefin with terminal unsaturated groups with an organosilane whose organic portion has a functional group reactive with the unsaturated group. The functional group may be an alphabeta double bond, an oxirane, an imine or an amine group.

Specifically, the polyolefin is heated to a temperature above 240° F. (about 115° C.) and preferably above 350° F. (about 175° C.), but below a temperature at which decomposition occurs. In a separate vessel, a free radical catalyst is mixed with an organosilane and an organic solvent at room temperature. The organosilane may be of any type in which the organic portion has a functional group reactive with the unsaturated radical of the polyolefin. A preferred material is an amino silane, for example gamma aminopropyltrialkoxy silane. After the catalyst and the organosilane are thoroughly mixed and dissolved in the solvent, this mixture while at room temperature is slowly blended into the hot resin.

The coating can be applied directly under the bushing or off line, the latter being preferred. The coating may be applied using a continuous sized bundle with a conventional aqueous size. The coating can be applied by any known method, e.g. through dispersion in water or another liquid, solution, hot melt coating or spraying, or electrostatic powder coating, hot melt coating being preferred.

Reference is also made to U.S. Pat. No.. 3,644,141, which describes a method for making organosilane-grafted polyolefins dispersible in water by incorporating such a polyolefin in a water dispersible polyester resin. This U.S. Patent (which is incorporated by reference) also includes a description of coupling of organosilane with polyolefin.

A measure of the amount of organic coating on a fiber is "Loss of Ignition" (LOI). LOI is the percentage weight loss which results when fibers are heated to burn off organic material. Typically, the fibers are heated to 600°-700° C., e.g. 650° C. An LOI of, for example, from 0.4 to 0.8%, preferably 0.5 to 0.7% is suitable for fibers coated with substantially non-adhesive, organosilane grafted or maleic anhydride grafted polyolefin. The preferred R08FX1 fiber has an LOI of between 0.5 and 0.7%.

The length of the fiber used is a further factor which affects the properties of the fiber filled resin. Thus, as fiber length is increased the degree of anisotropy and stiffness in the flow direction of a moulded article is increased but the CLTE and toughness are decreased in the flow direction. With very small fibers (those described as "milled"), the stiffness and CLTE of the resin are unsuitable for exterior automotive parts.

A critical range of fiber size cannot be stipulated because of the complex interaction of different parameters and the different physical properties desired for different applications. Fiber size is not, of course, relevant to the gist of the invention which resides in the non-reinforcing adhesion of the fibers to the resin. However, for good results we prefer that chopped strand fibers be used. More particularly, a length of from 3 to 6 mm, especially 4 to 5 mm, e.g. 4.5 mm, is preferred. This length is the manufacturer's nominal length and a small proportion of longer and shorter fibers will be present.

Fiber length may also be judged by the aspect ratio (length: diameter ratio) of the fibers. We have found an aspect ratio of about 320 (based on the manufacturer's nominal dimensions) to be satisfactory for exterior automotive parts and it is therefore preferred that the fibers have an aspect ratio of from 200 to 400. R08FX1 has a nominal length of 4.5 mm and diameter of 14 $\mu$m.

The fibers are broken during compounding and moulding of the resin, the degree of breakage being determined by the degree of shear. Typically, the nominal or average fiber length in the moulded resin is from 0.3 to 0.7 mm, especially in the order of 0.5 mm. For exterior automotive parts, the fiber generally needs to be side fed if a twin screw extruder is used, in order to avoid excessive fiber breakage.

The degree of anisotropy is a further factor which affects physical properties of the fiber-filled blend. A high degree of anisotropy reduces CLTE in the flow direction of the moulded resin and decreases elongation at break, and has the converse effect on properties in the cross flow direction. In the case of elongate articles, for example automotive rocker panels, a relatively high degree of anisotropy is desirable, in order that CLTE along the article may be adequately controlled. The degree of anisotropy may be increased by increasing fiber length and reduced by incorporating particles such as glass flakes, for example. Anisotropy is also increased by increasing the speed of injection moulding. The degree of anisotropy for any application can be selected by trial and error. A measure of isotropy is crossflow: flow direction flex modulus ratio.

Typically, the composition of the invention contains the PBT/PET and the PEE/PEI in a weight ratio (PBT/PET:PEE/PEI of no more than 60:40, e.g. from 20:80 to 50:50 or 60:40. In principle, the precise ratio used is not critical to the invention, but is determined by the desired properties for any particular application.

The total proportion of fiber is typically from 10 to 25% by weight based on the weight of the whole composition. If more than 25% fiber is used, undesirable fiber-related surface defects tend to arise, as well as a reduction in maximum elongation at break and CEAST (falling dart) impact strength. If less than 10% is used, the reduction in CLTE may be too small. Preferably the proportion of fiber is no more than 20% and, most preferably about 15%.

Although the following Examples demonstrate the use of glass fiber that do not substantially adhere to the resin, it is contemplated that appropriate mineral fibers could also be used.

The composition of the invention may further include additives, for example carbon black, antioxidants, UV-stabilizers, lubricants, plasticizers or other types of fillers. The total proportion of such additives typically amounts to no more than 5% by weight of the matrix of the composition (the matrix comprises the polymer and the additives). The composition generally contains an antioxidant, for example, 4,4-bis($\alpha,\alpha$-dimethylbenzyl) diphenylamine, 1,3,5-tris(3,5-di-tert-butyl-4-hydroxy hydrocinnamoyl)hexahydro-s-triazine or 1,6-bis [3-(3,5-di-tert-butyl-4-hydroxyphenyl)propionamido]hexane.

As a stabilizer, the composition may include a compound containing an amide linkage, e.g. a copolymer of polycaprolactam and polyhexamethylene adipamide, or a terpolymer of these two and polyhexamethylane sebacamide.

The antioxidant, stabilizer and any other additive may be incorporated at any stage. When the composition comprises a polyetherester, it is preferred that an antioxidant be present during the polycondensation stage of its preparation; it is also preferred that an antioxidant be present at any point in the process where poly(alkylene oxide)glycol is exposed to elevated temperatures, e.g. above about 100° C.

The composition may also contain glass flake in an amount of up to about 5% by weight of the whole composition, e.g. 2-3 wt%.

The compositions of the invention may be made by first mixing the base polymers, if more than one type is used, to form a preblend. The preblend or, as the case may be, single unmixed polymer (PEE or PEI) is then blended with the glass or mineral fiber that does not substantially adhere to the resin, and any other components, for example carbon black, antioxidant or glass flakes. The resultant blend may then be fed into an extruder. Alternatively, the ingredients may be fed separately into an extruder.

Preferably, a single screw extruder should be used or if a twin screw extruder is chosen, the fiber should preferably be side fed because the higher shear in a twin screw extruder tends to break the fiber into excessively small pieces.

The temperature and residence time of the extruder must be chosen in the usual way to avoid harmful degradation of the polymer. Generally, the melt temperature is of from about 220° C. to about 270° C. In a single screw extruder a temperature of from about 225° C. to 245° C., especially 230° C to 240° C., is preferred; usually the temperature does not exceed 240° C. A higher temperature, e.g. up to 270° C. and generally of at least 245° C. is often unavoidable in a twin screw extruder, because the higher shear makes it difficult to control the temperature.

After extrusion, the fiber-filled resin is usually quenched in water and cut into pellets for injection moulding into its final form. The injection moulding may be performed using a screw injection moulding machine. A melt temperature of between about 240° C. and about 260° C. (e.g. 245-255° C.) is customarily used and a mould temperature of from about 40° C. to 80° C., for example 50° C-70° C. Other important moulding parameters such as injection and hold pressures and times, and cooling time, may be adjusted for optimum appearance of the specimen, in the usual way.

The above temperatures especially mould temperature, would be somewhat higher if a PEE or PEI blend with PET were used.

Customarily, the moisture content of the polymers is controlled to avoid excessive polymer degradation, and we prefer to use polymers containing no more than about 0.25% water by weight, more preferably no more than 0.15% by weight based on the total weight of the resin. It is also the general practice to remove surface water from the quenched compounded material by compressed air; likewise the dried material is generally further dried in a vacuum oven if its moisture content is too high, e.g. above about 0.1 or 0.15 wt %.

The invention includes both the moulded and the extruded composition.

EXAMPLES

1. Preparation and Testing of Fiber-Filled Blends

The Resins

The polymers used to prepare the compounds of present invention were thermoplastic polybutyleneterephthalate (PBT) and polyetherester thermoplastic elastomers (PEE).

The PBT utilized for the present invention has a weight average molecular weight of 50,000 and an intrinsic viscosity of 0.70 dl/g (0.1g/100ml m-cresol, at 30° C.).

PEE A is a segmented copolyetherester containing 38 wt % 1,4-butylenet erephthalate and 11 wt % 1,4-isophthalate short chain ester units derived from poly(-tetramethylene ether)glycol having a number average molecular weight of about 1,000. PEE A has a Shore D hardness of 40 D.

PEE B is a segmented copolyetherester containing 35 wt % 1,4-butylene terephthalate short chain ester units derived from poly(tetramethylene ether)glycol having a number average molecular weight of about 2,000. PEE B also has a Shore D hardness of 40 D.

PEE C is substantially the same as PEE B except that it contains a minor amount of branching agent.

CB is a concentrate of carbon black in a base polyester similar to PEE A.

The Glass Fibers

The glass fiber referred to as 'standard' glass fiber was OCF R17BXI from Owens Corning Fiberglass (OCF), Belgium. This glass fiber is recommended by OCF for reinforcement of PBT as well as of other engineering polymers such as PET and Nylon. The glass fiber referred to as 'non-adhesive' glass fiber was OCF R08FXI from Owens Corning Fiberglass, Belgium. That glass fiber is recommended by OCF for polycarbonate and PVC for improved toughness with fiber levels of up to 10%. OCF's literature indicates that OCF R08FXl does not improve elongation in straight PBT, nor in PET. The differentiation in fiber/matrix adhesion between OCF R17BXI and OCF R08FXI is based on Scanning Electron Microscopy (SEM) pictures which indicate good adhesion of polyester blend to OCF R17BXl and no polymer adhesion of polyester blend to OCF R08FXl.

In the following Tables glass fibers OCF R17BXI and OCF R08FXI are identified as follows:
Glass Fiber 1—OCF R17BXI
Glass Fiber 2—OCF R08FXI

Preparation

General Procedure

To avoid excessive polymer degradation only PBT and polyetherester (PEE) that had a moisture content below 0.15% were used. The ingredients were then mixed in their proper proportions in a suitable vessel such as a drum or a plastic bag. The mixture was then melt blended in a 2.5" (6.35 cm) single screw extruder from EAGAN at a melt temperature at the exit of the die of 230° to 240° C., using a standard screw designed for melt blending glass filled polymers. Melt temperatures above 240° C. may be used for other reasons such as for adjustment of extrusion rate and melt viscosity of the blend. Some compounds of this invention have also been prepared on a 25mm twin screw extruder from Berstorff at a measured melt temperature of 250° to 265° C. In this case the glass fibers were side fed downstream to avoid excessive fiber breakage, whereas all remaining ingredients were fed into the rear of the extruder. The compounded material exiting the die was quenched in water, surface water removed by compressed air and cut into pellets. In cases where the remaining moisture content was higher than 0.1% the material was dried in a vacuum oven. The dried material was then molded into test specimens using a DEMAG D60-182 standard screw injection molding machine. Preferably a melt temperature of 245° to 255° C. and a mould temperature of 50° to 70° C. was used. Other important moulding parameters such as injection and hold pressure and times and cooling time were adjusted for optimum appearance of the specimen.

In some of the Examples, the moulded specimens are annealed in order to simulate the paint oven cycle. Annealing relieves internal stresses and helps obtain full crystallisation.

Test Methods

If not otherwise indicated dry-as-molded (DAM) test specimens were used for testing physical properties. MELT VISCOSITY was determined on a Kayeness viscometer at 250° C. and 5 different shear rates. Only pellets dried to a moisture content below 0.15% were used.

SHRINKAGE was determined on 3" (7.6 cm)×4" (10.2 cm) ×2 or 3 mm plaques and measured parallel as well as perpendicular to the flow direction. All plaques were endgated on the 3" (7.6 mm) side with a film gate 2.75" (6.99 cm) wide and 1 mm thick.

The COEFFICIENT OF LINEAR THERMAL EXPANSION (CLTE) was analysed by Thermo-Mechanical-Analysis (TMA). A Thermo Mechanical Analyzer 943 from Du Pont Instruments was used, attached to a Computer/Thermal Analyzer 9900 from Du Pont Instruments. The test specimens normally had a height of ca.5 mm. They were cut either from the midsection of a dumbbell tensile bar (according to DIN 53455) or from the center of a 3" (7.6 cm)×4" (10.2 cm)×3 mm plaque. CLTE both parallel and perpendicular to the flow direction were measured, to assess the isotropy of the injection moulded specimen. Before testing, all specimens were annealed for 1h at 90° or 120° C. As indicated in the Tables, the single measurements of CLTE parallel and perpendicular to the flow direction were determined either on two separate samples or both CLTEs were measured on the same sample, first in parallel then in cross flow direction.

TENSILE PROPERTIES such as tensile strength and elongation were determined on injection moulded dumbbell bars according to DIN 53455 and/or on dumbbell bars (type B, according to ASTM D412) which were die-cut from 3" (7.6 cm) ×4" (10.2 cm)×2 or 3 mm plaques, parallel and perpendicular to the flow direction. A test speed of 25 mm/min was used.

FLEX MODULUS was determined according to ASTM D790 on test specimens 1" (2.5 cm) wide, die-cut from 3" (7.6 cm)× 4" (10.2 cm)×2 or 3 mm plaques parallel and perpendicular to the flow direction. The ratio of flex modulus in parallel versus cross flow direction multiplied by 100 can be taken as an indicator for isotropy of the specimen which is known to be affected by the degree of glass fiber orientation.

TEAR STRENGTH was determined according to ASTM D624 or DIN 53515 using die B type test bar and a crosshead speed of 25 mm/min. Test specimen were die cut from 3" (7.6 cm) ×4" (10.2 cm)×2 or 3 mm plaques parallel and perpendicular to the flow direction, measuring tear strength across and in flow direction, respectively.

DYNSTAT IMPACT STRENGTH according to DIN 53435 was determined on both unnotched and notched 16×10×2 or 3 mm test specimens which were die-cut from 3" (7.6 cm)×4" (10.2 cm)×3 mm plaques parallel and perpendicular to the flow direction. A 2 Joule hammer was used.

CEAST IMPACT STRENGTH was determined with an Advanced Fractoscope System "AFS/MK3" CEAST Modular Falling Weight cod.6557/000 at a test temperature of +23 and −25C. A test load of 11.5 kg at a falling height of 1.27 m resulted in an impact speed of 5 m/sec. Only 3" (7.6 cm)×4" (10.2 cm)× 2" or 3 mm plaques were used. Before the impact test the plaques were stored in the temperature chamber at the test temperature for at least 1.5 h.

NOTCHED IZOD IMPACT STRENGTH was determined for resins 24 to 34 of Example 5 according to ASTM D256. Test bars the size of a Charpy bar (DIN 53453) were die-cut from 3" (7.6 cm)×4" (10.2 cm)×3 mm plaques parallel to the flow direction, notched and then tested.

Test Results and Tables

Where not otherwise specified in this specification and claims, temperatures are given in degrees centigrade, and all parts, proportions and percentages are by weight.

EXAMPLE 1 (refer to resins 1 and 2 in Table 1)

A mixture of dry 50% poly(butyleneterephthalate), 30% PEE A and 2% carbon black concentrate was blended uniformly in a polyethylene bag. The mixture was then fed into the rear of a 25 mm Berstorff twin screw extruder with 82% of the total feed rate. The remaining 18% glass fibers OCF R17BXI or 18% OCF R08FX1 of the composition were side fed with 18% of the total feed rate of 7 kg/hr at barrel to die temperature settings of 250/240/245/245/245/245/245° C. and RPM of 200. During the extrusion the melt temperature was between 250 and 265° C.; vacuum was used.

The extrudate exiting the die was quenched in water, the surface water on the strands removed by compressed air and cut into pellets. The pellets were then dried in a vacuum oven at 80° to 100° C. overnight. Those pellets were then molded into 3" (7.6 cm)×4" (10.2 cm) x 2 mm plaques. From those DAM plaques type B dumbbell tensile bars and 1" (2.5 cm) wide flex bars were die-cut parallel and perpendicular to the flow direction and tested in accordance with ASTM D412 and ASTM D790, respectively. For Tear strength, Dynstat impact strength, CEAST impact strength and shrinkage 3" (7.6 cm)×4" (10.2 cm)×(2 or 3 mm plaques were utilized. Melt viscosity and % ash were determined from dried pellets.

The test results in Table 1 show that resin 2 with non-adhesive glass fiber OCF R08FX1 had a lower tensile strength, but at the same time a surprisingly higher elongation at break in flow direction as well as cross flow direction compared to resin reinforced with standard glass fiber OCF R17BX1.

SEM pictures of resins 1 and 2 are shown respectively in FIGS. 1 and 2. OCF R17BXI clearly adheres to the resin, whilst OCF R08FXI shows no adhesion.

EXAMPLE 2 (refer to resins 3 to 13 in Table 2)

These resins ar glass fiber and glass flake filled PBT/PEE compounds which were prepared on a 2.5" (6.4 cm) EAGAN single screw extruder. To these and subsequent resins described in Examples 3, 4, 5 and 6, 0.3% antioxidant Irganox 1010 (tetrakis[methylene(3,5-ditertiarybutyl-4-hydroxy cinnamate)]methane) was added to allow injection molding at higher melt temperatures of up to 265° C. without excessive polymer degradation. Some of the resins included a lubricant, Radia 7176, which is a pentaerythrytoltetrastearate. To make up these blends only dry polymer was used. The mixtures of all ingredients were uniformly blended in a polyethylene bag. These mixtures were then fed into the rear of the extruder and compounded at barrel temperature settings of 230° C., RPM of 30 and an average feed rate of ca.20r.

The extrudates exiting the die were quenched in water, the surface water removed by compressed air and cut into pellets. The pellets were then dried in a vacuum oven at 80 to 100° C. overnight. Those pellets were then molded into dumbbell bars according to DIN 53455 and 3" (7.6 cm)× 4"(10.2 cm)×2 and 3 mm plaques. From the DAM plaques, type B dumbbell bars and 1" (2.5 cm) wide flex bars were die-cut parallel and perpendicular to the flow direction and tested in accordance with ASTM D412 and ASTM D790, respectively. Other properties were tested in the same way as described for Example 1.

The data in Table 2 show that flex modulus of this type of blend can be adjusted by both PBT/PEE ratio and the glass fiber level and that elongation at break of resins 3 to 12, all containing OCF R08FXI, is larger than 300%, significantly higher than usually found for glass reinforced polymers. Resin 13, which is a control to resin 9 but contains standard glass fiber OCF R17BXI, exhibits elongation of less than 20%. The elongation of only 4% determined on injection molded tensile bars of resin 9 is believed to be an anomaly and could partially have resulted from the presence of 2% glass flakes. However the tensile bars die-cut from plaques do also show for resin 9 elongations of larger than 300%. Comparing the CEAST impact strength of resins 9 and 11 does also show increased toughness at both +23° C. and −25° C. for resin 9, containing OCF R08FXI. Another important finding is that CLTE especially in flow direction is as effectively reduced with OCF R08FX1 as with RI7BX1.

EXAMPLE 3 (refer to resins 14 to 18 in Table 3)

Resins 14 to 18 were prepared in the same manner as described for resins 3 to 13 in Example 2.

All 5 resins contain a total level of glass fibers of 15%, resins 14, 15 and 16 contain OCF R08FXI and resins 17 and 18 contain OCF R17BX1.

As the ratio of PBT to the total of PEE A and PEE B increases from 28/72 to 40/60 to 52/48 for resin 14 to 15 to 16, the flex modulus increases from 887 to 1030 to 1903 Mpa on die-cut test specimen. The 1030 MPa found for resin 15 is unusually low and should be as high as the 1425 MPa measured for the control resin 5. The comparison of the flex moduli of resins 16, filled with OCF R08FXI and resin 18, reinforced with OCF R17BXI does confirm almost identical stiffness independent of the degree of glass fiber adhesion.

The data confirm dramatically improved elongation at break and CEAST impact strength for resins 14, 15 and 16 compared to resins 17 and 18. Resins 14, 15 and 16 further show that toughness decreases as the level of PBT increases. The opposite trend, that of an increasing level of toughness with an increased proportion of PEE, implies that with a higher level of PEE the level of glass fibers OCF R08FX1 can be increased to more than 15% before elongation and CEAST impact strength is adversely affected (see Example 5 and 6). Other properties such as tear strength, Dynstat toughness and CLTE are also listed for comparison.

EXAMPLE 4 (refer to resins 19 to 23 in Table 4)

Resins 19 to 23 were prepared in the same manner as described for resins 3 to 13 in Example 2.

Resins 19 to 23 contain only grade of PEE. In resins 19 to 23 the total level of glass fibers was 15%. To evaluate the effect of decreasing fiber adhesion, the ratio of the mixture of OCF R08FX1 to OCF R17BX1 was changed from 0/15 to 7.5/7.5 to 10/5 to 12.5/2.5 to 15/0 in resins 19 to 23.

The flex moduli of all 5 resins is virtually the same. As with decreasing glass fiber adhesion the tensile strength decreases, the elongation at break and the CEAST impact strength increase significantly. The elongation in the flow direction of resin 20 appears to be anomalously low, probably as a result of surface defects or fiber agglomeration.

The absolute toughness of the resins in example 4 is however not quite as high as for the equivalent resins in Example 3. Resin 15 has for example both a higher elongation at break and requires a higher total CEAST impact energy at −25° C. than resin 23, indicating that the partial or total replacement of PEE B by PEE A can result in tougher compounds.

However, the lower melting PEE A does diminish heat sag performance of these glass filled PBT/PEE compounds more than the higher melting PEE B does and the selection of the type of PEE and the ratio of the mixture of different types of PEE will therefore depend on the required balance of mechanical and thermal properties.

The resins containing both R08FX1 and R17BX1 may be considered a rough model of resin filled with low adhesive fiber having an adhesion intermediate that of non-adhesive and reinforcing fiber.

Example 5 (refer to resins 24 to 34 in Table 5)

Resins 24 to 34 were prepared in the same manner as described for resins 3 to 13 in Example 2.

Resins 24, 25 and 26 are equivalent to resins 14, 15 and 16 in Example 3, but PEE B was replaced by PEE C and glass fiber OCF R08FXI with a lower level of coating [loss of ignition (LOI) of 0.55%] was used. Resin 27 does contain PEE B as a second type of PEE as does resin 15, but low LOI OCF R08FXI was used as well. The average level of coating (LOI) on glass fiber OCF R08FXI used in all other resins, including resins 28 to 34 of Example 5 was 0.65%.

In resins 28, 29 and 30 only the type of toughening PEE was varied at a constant PBT/PEE ratio of 40/60 and 15% OCF R08FXl. In resins 31 and 32 the PBT/PEE A ratio was 28/72 with an increased level of OCF R08FXI of 20 and 25%, respectively. Resins 33 and 34 are equivalent to resins 31 and 32 but contain standard glass fiber OCF R17BXI.

All those resins filled with OCF R08FXI do exhibit higher elongation at break and CEAST impact strength at −25° C. at virtually the same Dynstat and Notched Izod impact strength.

EXAMPLE 6 (refer to resins 35 to 40 in Table 6)

Resins 35 to 40 were prepared in the same manner as described for resins 3 to 13 in Example 2.

All 6 resins in Example 6 are based on various ratios of PBT and PEE A. The use of only PEE A as toughening polymer was chosen because resins in the previous Examples had indicated an increase in toughness even at low test temperatures as PEE B was replaced by PEE A. Further adjustments were made in terms of PBT/PEE ratio (resin 35) and glass fiber level (resins 37 to 40) to explore the toughness limits of these compounds. Resin 36 is equivalent to resin 35, but 15% OCF R08FXI was replaced by 15% OCF R17BXI.

The resins 35, 37, 38, 39 and 40, containing non-adhesive OCF R08FXl do all exhibit a drastically increased elongation at break of larger than 300% in flow direction compared to only 10% for resin 36, reinforced with standard glass fiber OCF R17BXI. Resin 36, containing standard OCF R17BXI, does also have a significantly lower CEAST impact strength at −25° C. compared to resin 35, containing OCF R08FXl.

TABLE 1

| EXAMPLE 1 | | |
|---|---|---|
| RESIN No. | 1 | 2 |
| Fed into rear of extruder | | |
| PBT | 50 | 50 |
| PEE B | 30 | 30 |
| CB | 2 | 2 |
| Fed into side of extruder | | |
| Glass Fibre 1 | 18 | — |
| Glass Fibre 2 | — | 18 |
| PBT/PEE Ratio (excluding carbon black concentrate) | ← 62.5–37.5 → | |
| % ash (pellets) | 16.9 | 15.8 |
| Properties of specimen die-cut from 3" × 4" × 2 mm plaques | | |
| Flex Modulus MPa | | |
| in flow | 2351 | 1961 |
| cross flow | 1050 | 976 |
| Tensile Strength MPa | | |
| in flow | 43.9 | 21.2 |
| cross flow | 26.9 | 19.2 |
| Elongation at break % | | |
| in flow | 7.0 | 25.0 |
| cross flow | 9.3 | 70.7 |

TABLE 2

EXAMPLE 2

| RESIN No. | 3 | 4 | 5 | 6 | 7 | 8 | 9 | 10 | 11 | 12 | 13 |
|---|---|---|---|---|---|---|---|---|---|---|---|
| PBT | 34.8 | 34.8 | 34.0 | 33.2 | 23.2 | 23.8 | 23.2 | 28.2 | 33.2 | 32.9 | 33.2 |
| PEE A | — | 26.1 | 25.5 | 24.9 | 29.9 | 30.6 | 29.9 | 27.4 | 24.9 | 24.6 | 24.9 |
| PEE B | 52.2 | 26.1 | 25.5 | 24.9 | 29.9 | 30.6 | 29.9 | 27.4 | 24.9 | 24.6 | 24.9 |
| CB | 1.7 | 1.7 | 1.7 | 1.7 | 1.7 | 1.7 | 1.7 | 1.7 | 1.7 | 1.7 | 1.7 |
| Glass Fibre 1 | 11.0 | 11.0 | 13.0 | 15.0 | 15.0 | 13.0 | 13.0 | 13.0 | 13.0 | 13.0 | — |
| Glass Fibre 2 | — | — | — | — | — | — | — | — | — | — | 13.0 |
| Glass Flake | — | — | — | — | — | — | 2.0 | 2.0 | 2.0 | 2.0 | 2.0 |
| Radia 7176 | — | — | — | — | — | — | — | — | — | 0.8 | — |
| Irganox 1010 | 0.3 | 0.3 | 0.3 | 0.3 | 0.3 | 0.3 | 0.3 | 0.3 | 0.3 | 0.3 | 0.3 |
| PBT/PEE Ratio (excluding CB) | | ← 40/60 → | | | ← 28/72 → | | | 34/66 | | ← 40/60 → | |
| Kayeness Melt viscosity at 250 C. Pas (pellets) | | | | | | | | | | | |
| 55/s | 453 | 437 | 468 | 511 | 509 | 518 | 455 | 486 | 481 | — | 471 |
| 97/s | 351 | 349 | 371 | 400 | 417 | 395 | 403 | 374 | 375 | 331 | 362 |
| 555/s | 231 | 229 | 240 | 251 | 253 | 245 | 237 | 240 | 239 | 224 | 234 |
| 1000/s | 192 | 187 | 196 | 201 | 202 | 197 | 196 | 196 | 194 | 192 | 191 |
| 2777/s | 119 | 116 | 123 | 120 | 120 | 123 | 118 | 117 | 116 | 111 | 116 |
| ash % | 11.0 | 11.2 | 12.5 | 15.2 | 14.7 | 11.9 | 14.8 | 16.5 | 15.4 | 15.0 | 15.8 |
| Shrinkage % 3" × 4" × 2 mm plaques | | | | | | | | | | | |
| in flow | 0.30 | 0.29 | 0.27 | 0.20 | 0.20 | 0.25 | 0.20 | 0.20 | 0.25 | 0.20 | 0.20 |
| cross flow | 0.60 | 0.60 | 0.60 | 0.53 | 0.57 | 0.47 | 0.47 | 0.53 | 0.47 | 0.53 | 0.47 |
| Flex Modulus MPa bars die-cut from 3" × 4" × 2 mm plaques | | | | | | | | | | | |
| in flow | 1002 | 1087. | 1168 | 1350 | 941 | 760 | 884 | 1055 | 1226 | 1209 | 1267 |
| cross flow | 460 | 520 | 551 | 569 | 368 | 342 | 345 | 419 | 520 | 524 | 526 |
| Tensile Properties T-bars | | | | | | | | | | | |
| Y-Str MPa | 23.3 | 22.4 | 23.3 | 23.6 | 21.0 | 22.3 | 21.1 | 20.1 | 20.9 | 20.3 | 36.9 |
| *Eb % | 351 | 342 | 359 | 365 | 372 | 422 | 405 | 366 | 4 | 19 | 16 |
| Tensile Properties bars die-cut from 3" × 4" × 2 mm plaques | | | | | | | | | | | |
| Yield Strength MPA | | | | | | | | | | | |
| in flow | 22.2 | 23.1 | 21.7 | 21.7 | 21.4 | 22.1 | 20.8 | 20.3 | 19.9 | 21.3 | 32.1 |
| cross flow | 19.5 | 19.5 | 19.0 | 17.7 | 18.3 | 19.6 | 17.9 | 17.1 | 17.7 | 17.4 | 19.5 |
| Elongation at break % | | | | | | | | | | | |
| in flow | 352 | 231 | 334 | 332 | 417 | 438 | 419 | 347 | 304 | 331 | 18 |
| cross flow | 392 | 392 | 365 | 336 | 477 | 524 | 468 | 390 | 336 | 330 | 16 |
| Tear Strength N/mm bars die-cut from 3" × 4" × 2 mm plaques | | | | | | | | | | | |
| in flow | — | — | — | 123 | 106 | — | — | — | 125 | — | 146 |
| cross flow | — | — | — | 163 | 137 | — | — | — | 161 | — | 198 |
| PBT | 34.8 | 34.8 | 34.0 | 33.2 | 23.2 | 23.8 | 23.2 | 28.2 | 33.2 | 32.9 | 33.2 |
| PEE A | — | 26.1 | 25.5 | 24.9 | 29.9 | 30.6 | 29.9 | 27.4 | 24.9 | 24.6 | 24.9 |
| PEE B | 52.2 | 26.1 | 25.5 | 24.9 | 29.9 | 30.6 | 29.9 | 27.4 | 24.9 | 24.6 | 24.9 |
| CB | 1.7 | 1.7 | 1.7 | 1.7 | 1.7 | 1.7 | 1.7 | 1.7 | 1.7 | 1.7 | 1.7 |
| Glass Fibre 2 | 11.0 | 11.0 | 13.0 | 15.0 | 15.0 | 13.0 | 13.0 | 13.0 | 13.0 | 13.0 | — |
| Glass Fibre 1 | — | — | — | — | — | — | — | — | — | — | 13.0 |
| Glass Flake | — | — | — | — | — | — | 2.0 | 2.0 | 2.0 | 2.0 | 2.0 |
| Radia 7176 | — | — | — | — | — | — | — | — | — | 0.8 | — |
| Irganox 1010 | 0.3 | 0.3 | 0.3 | 0.3 | 0.3 | 0.3 | 0.3 | 0.3 | 0.3 | 0.3 | 0.3 |
| PBT/PEE Ratio (excluding CB) | | ← 40.60 → | | | ← 28/72 → | | | 34/66 | | ← 40/60 → | |
| CEAST Impact Energy J 3" × 4" × 2 mm plaques 11.5 kg; 1.27 m; 5 m/sec | | | | | | | | | | | |
| at 23 C. | | | | | | | | | | | |
| break | 19 | 19 | 17 | 14 | 14 | 17 | 15 | 12 | 16 | 19 | 13 |
| total | 21 | 21 | 18 | 16 | 16 | 19 | 16 | 15 | 18 | 21 | 17 |
| mode | d | d | d | d | d | d | d | d | d | d | d |
| at −25 C. | | | | | | | | | | | |
| break | 24 | 23 | 22 | 20 | 22 | 24 | 22 | 19 | 20 | 17 | 9 |
| total | 28 | 27 | 26 | 23 | 26 | 27 | 25 | 23 | 23 | 22 | 16 |
| mode | d | d | d | d | d | d | d | d | d | d | b |
| Dynstat notched/in flow/KJ/m2/bars die-cut from 3" × 4" × 3 mm pl. | | | | | | | | | | | |
| at +23 C. | nb | nb | nb | nb | nb | nb | nb | nb | nb | nb | nb |
| at −25 C. | nb | pb 27 | pb 26 | pb 22 | nb | nb | nb | nb | pb 28 | pb 22 | pb 23 |
| Dynstat notched/cross flow/KJ/m2/bars die-cut from 3" × 4" × 3 mm pl. | | | | | | | | | | | |
| at +23 C. | nb | nb | nb | nb | nb | nb | nb | nb | nb | nb | nb |
| at −25 C. | nb | nb | nb | pb 24 | nb | nb | nb | nb | pb 24 | pb 22 | pb 26 |
| CLTE/× 10−6 mm/mm C. by TMA/specimen from T-bars | | | | | | | | | | | |
| in flow* | | | | | | | | | | | |
| −25 → +25 C. | 36 | 36 | 31 | 32 | 26 | 16 | 35 | 35 | 30 | 35 | 29 |
| +25 → +120 C. | 56 | 49 | 41 | 35 | 39 | 27 | 38 | 53 | 44 | 26 | 30 |
| cross flow* | | | | | | | | | | | |
| −25 → +25 C. | 165 | 132 | 120 | 119 | 134 | 153' | 142 | 29 | 142 | 108 | 91 |
| +25 → +120 C. | 214 | 162 | 175 | 152 | 169 | 181 | 161 | 33 | 139 | 149 | 136 |

*Eb = Extension at break
d = ductile; b = brittle; nb = no break; pb = partial break
*values were determined on two different samples; before testing the samples were annealed for 1 hr at 90 C.

TABLE 3

EXAMPLE 3

| RESIN No. | 14 | 15 | 16 | 17 | 18 |
|---|---|---|---|---|---|
| PBT | 23.2 | 33.2 | 43.2 | 33.2 | 43.2 |
| PEE A | 29.9 | 24.9 | 19.9 | 24.9 | 19.9 |
| PEE B | 29.9 | 24.9 | 19.9 | 24.9 | 19.9 |
| CB | 1.7 | 1.7 | 1.7 | 1.7 | 1.7 |
| Glass Fibre 2 | 15.0 | 15.0 | 15.0 | — | — |
| Glass Fibre 1 | — | — | — | 15.0 | 15.0 |
| Irganox 1010 | 0.3 | 0.3 | 0.3 | 0.3 | 0.3 |
| PBT/PEE Ratio (excluding CB) | 28/72 | 40/60 | 52/48 | 40/60 | 52/48 |

Kayeness Melt viscosity at 250 C. Pas (pellets)

| | | | | | |
|---|---|---|---|---|---|
| 55/s | — | 343 | 444 | 482 | 345 |
| 97/s | — | 359 | 362 | 360 | 359 |
| 555/s | — | 240 | 240 | 239 | 232 |
| 1000/s | — | 192 | 193 | 193 | 188 |
| 2777/s | — | 115 | 119 | 119 | 117 |
| ash % | — | 14.3 | 15.0 | 14.9 | 15.0 |

Shrinkage % 3" × 4" × 3 mm plaques

| | | | | | |
|---|---|---|---|---|---|
| in flow | 0.25 | 0.27 | 0.30 | 0.30 | 0.32 |
| cross flow | 0.60 | 0.63 | 0.93 | 0.70 | 0.90 |

Flex Modulus MPa bars die-cut from 3" × 4" × 3 mm plaques

| | | | | | |
|---|---|---|---|---|---|
| in flow | 887 | 1030? | 1903 | 1425 | 1843 |
| cr flow/near | 450 | 523 | 1063 | 817 | 953 |
| cr flow/far gate | 393 | 573 | 1027 | 650 | 917 |

Tensile Properties bars die-cut from 3" × 4" × 3 mm plaques

Yield Strength MPA

| | | | | | |
|---|---|---|---|---|---|
| in flow | 20 | 21 | 25 | — | 36 |
| cross flow | — | — | 20 | — | 26 |

Tensile Strength MPa

| | | | | | |
|---|---|---|---|---|---|
| in flow | — | — | 21 | 24 | 34 |
| cross flow | 18 | 19 | 20 | 19 | 23 |

Elongation at break %

| | | | | | |
|---|---|---|---|---|---|
| in flow | 300 | >300 | 72 | 23 | 16 |
| cross flow | 300 | >300 | 80 | 15 | 12 |

Tear Strength N/mm bars die-cut from 3" × 4" × 3 mm plaques

| | | | | | |
|---|---|---|---|---|---|
| in flow | 141 | 148 | 169 | 136 | 145 |
| cross flow | 143 | 153 | 189 | 173 | 193 |
| PBT | 23.2 | 33.2 | 43.2 | 33.2 | 43.2 |
| PEE A | 29.9 | 24.9 | 19.9 | 24.9 | 19.9 |
| PEE B | 29.9 | 24.9 | 19.9 | 24.9 | 19.9 |
| CB | 1.7 | 1.7 | 1.7 | 1.7 | 1.7 |
| Glass Fibre 2 | 15.0 | 15.0 | 15.0 | — | — |
| Glass Fibre 1 | — | — | — | 15.0 | 15.0 |
| Irganox 1010 | 0.3 | 0.3 | 0.3 | 0.3 | 0.3 |
| PBT/PEE Ratio (excluding CB) | 28/72 | 40/60 | 52/48 | 40/60 | 52/48 |

CEAST Impact Energy J 3" × 4" × 3 mm plaques

| | | | | | |
|---|---|---|---|---|---|
| break | 38 | 39 | 25 | 10 | 5 |
| total | 40 | 43 | 29 | 19 | 13 |
| mode | d | d | b | b | b |

Dynstat - notched at −25 C. - KJ/m2 3" × 4" × 3 mm plaques

| | | | | | |
|---|---|---|---|---|---|
| in flow | nb | pb 24 | cb 7 | pb 22 | cb 13 |
| cross flow | nb | pb 20 | cb 6 | pb 23 | cb 12 |

Dynstat - unnotched at −25 C. - KJ/m2 3" × 4" × 3 mm plaques

| | | | | | |
|---|---|---|---|---|---|
| in flow | nb | nb | pb 18 | pb 28 | pb 21 |
| cross flow | nb | nb | nb | nb | nb |

CLTE × 10−6 mm/mm C. by TMA - RT to +100 C. - 3" × 4" × 3 mm plaques

| | | | | | |
|---|---|---|---|---|---|
| in flow* | 10 | 29 | 19 | 58 | 41 |
| cross flow* | 57 | 64 | 86 | 46 | 51 | d = ductile; b = brittle; nb = no break; pb = partial break cb = complete break
*both values were determined on the same sample; before testing the sample was annealed for 1 hr at 120 C.

TABLE 4

EXAMPLE 4

| RESIN No. | 19 | 20 | 21 | 22 | 23 |
|---|---|---|---|---|---|
| PBT | 33.2 | 33.2 | 33.2 | 33.2 | 33.2 |
| PEE B | 49.8 | 49.8 | 49.8 | 49.8 | 49.8 |
| CB | 1.7 | 1.7 | 1.7 | 1.7 | 1.7 |
| Glass Fibre 2 | — | 7.5 | 10.0 | 12.5 | 15.0 |
| Glass Fibre 1 | 15.0 | 7.5 | 5.0 | 2.5 | — |
| Irganox 1010 | 0.3 | 0.3 | 0.3 | 0.3 | 0.3 |
| PBT/PEE Ratio (excluding CB) | ← 40/60 → | | | | |

Kayeness Melt viscosity at 250 C. Pas (pellets)

| | | | | | |
|---|---|---|---|---|---|
| 55/s | 559 | 596 | 545 | 555 | 565 |
| 97/s | 421 | 428 | 424 | 424 | 410 |
| 555/s | 252 | 260 | 256 | 256 | 254 |
| 1000/s | 202 | 205 | 203 | 203 | 201 |
| 2777/s | 127 | 126 | 126 | 126 | 121 |
| ash % | 14.2 | 15.2 | 15.3 | 15.8 | 15.7 |

Shrinkage % 3" × 4" × 3 mm plaques

| | | | | | |
|---|---|---|---|---|---|
| in flow | 0.27 | 0.33 | 0.30 | 0.30 | 0.30 |
| cross flow | 0.73 | 0.73 | 0.76 | 0.68 | 0.60 |

Flex Modulus MPa bars die-cut from 3" × 4" × 3 mm plaques

| | | | | | |
|---|---|---|---|---|---|
| in flow | 1217 | 1150 | 1223 | 1283 | 1267 |
| cr flow/near | 623 | 597 | 587 | 573 | 643 |
| cr flow/far | 673 | 627 | 640 | 613 | 620 |

Tensile Properties bars die-cut from 3" × 4" × 3 mm plaques

Yield Strength MPA

| | | | | | |
|---|---|---|---|---|---|
| in flow | — | — | 22 | 22 | — |
| cross flow | — | — | — | — | — |

Tensile Strength MPa

| | | | | | |
|---|---|---|---|---|---|
| in flow | 31 | 25 | 20 | 19 | 19 |
| cross flow | 22 | 18 | 19 | 18 | 18 |

Elongation at break %

| | | | | | |
|---|---|---|---|---|---|
| in flow | 21 | 13 | 78 | 83 | 247 |
| cross flow | 12 | 138 | 269 | 284 | 288 |

Tear Strength N/mm bars die-cut from 3" × 4" × 3 mm plaques

| | | | | | |
|---|---|---|---|---|---|
| in flow | 137 | 135 | 135 | 141 | 140 |
| cross flow | 162 | 168 | 164 | 162 | 157 |
| PBT | 33.2 | 33.2 | 33.2 | 33.2 | 33.2 |
| PEE B | 49.8 | 49.8 | 49.8 | 49.8 | 49.8 |
| CB | 1.7 | 1.7 | 1.7 | 1.7 | 1.7 |
| Glass Fibre 2 | — | 7.5 | 10.0 | 12.5 | 15.0 |
| Glass Fibre 1 | 15.0 | 7.5 | 5.0 | 2.5 | — |
| Irganox 1010 | 0.3 | 0.3 | 0.3 | 0.3 | 0.3 |
| PBT/PEE Ratio (excluding CB) | ← 40/60 → | | | | |

CEAST Impact Energy at −25 C. - J 3" × 4" × 3 mm plaques

| | | | | | |
|---|---|---|---|---|---|
| break | 8 | 8 | 9 | 10 | 17 |
| total | 20 | 19 | 20 | 23 | 25 |
| mode | b | b | b | b | b |

Dynstat notched at −25 C. - KJ/m2 3" × 4" × 3 mm plaques

| | | | | | |
|---|---|---|---|---|---|
| in flow | pb 23 | pb 20 | pb 20 | pb 16 | pb 19 |
| cross flow | pb 27 | pb 20 | pb 16 | pb 18 | pb 18 |

Dynstat unnotched at −25 C. - KJ/m2

| | | | | | |
|---|---|---|---|---|---|
| in flow | pb 29 | pb 24 | pb 21 | pb 23 | pb 24 |
| cross flow | nb | nb | nb | nb | nb |

CLTE × 10−6 mm/mm C. by TMA - RT to +100 C. - 3" × 4" × 3 mm plaques

| | | | | | |
|---|---|---|---|---|---|
| in flow* | 14 | 21 | 63 | 43 | 55 |
| cross flow* | 35 | 36 | 39 | 52 | 40 | b = brittle; nb = no break; pb = partial break
*both values were determined on the same sample; before testing the sample was annealed for 1 hr at 120 C.

TABLE 5a

EXAMPLE 5

| RESIN NO. | 24 | 25 | 26 | 27 | 28 | 29 | 30 |
|---|---|---|---|---|---|---|---|
| PBT | 23.2 | 33.2 | 43.2 | 33.2 | 33.2 | 33.2 | 33.2 |
| PEE A | 29.9 | 24.9 | 19.9 | 24.9 | 49.8 | — | — |
| PEE B | — | — | — | 24.9 | — | 49.8 | — |
| PEE C | 29.9 | 24.9 | 19.9 | — | — | — | 49.8 |
| CB | 1.7 | 1.7 | 1.7 | 1.7 | 1.7 | 1.7 | 1.7 |
| Glass Fibre 2 | 15.0* | 15.0* | 15.0* | 15.0* | 15.0 | 15.0 | 15.0 |

TABLE 5a-continued

EXAMPLE 5

| RESIN NO. | 24 | 25 | 26 | 27 | 28 | 29 | 30 |
|---|---|---|---|---|---|---|---|
| Irganox 1010 | 0.3 | 0.3 | 0.3 | 0.3 | 0.3 | 0.3 | 0.3 |
| PBT/PEE Ratio (excluding CB) | 28/72 | 40/60 | 52/48 | ← 40/60 → | | | |
| Kayeness Melt viscosity at 250 C./Pas (pellets) | | | | | | | |
| 55/s | 532 | 527 | 476 | 549 | 447 | 468 | 490 |
| 97/s | 425 | 411 | 406 | 388 | 377 | 364 | 396 |
| 555/s | 258 | 241 | 241 | 245 | 237 | 228 | 244 |
| 1000/s | 199 | 195 | 193 | 193 | 192 | 185 | 195 |
| 2777/s | 119 | 119 | 117 | 119 | 118 | 111 | 116 |
| ash % | 12.8 | 13.8 | 14.1 | 14.8 | 12.7 | 14.6 | 14.4 |
| Shrinkage % | | | | | | | |
| in flow | 0.25 | 0.30 | 0.32 | 0.25 | 0.25 | 0.30 | 0.30 |
| cross flow | 0.53 | 0.60 | 0.69 | 0.60 | 0.53 | 0.69 | 0.72 |
| Test specimen die-cut from 3" × 4" × 3 mm plaques | | | | | | | |
| Flex Modulus MPa | | | | | | | |
| in flow | 766 | 1174 | 1419 | 1359 | 1204 | 1139 | 1108 |
| cross flow | 435 | 618 | 727 | 655 | 602 | 575 | 591 |
| Yield Strength MPa | | | | | | | |
| in flow | 17 | 19 | 17 | 17 | 16 | 16 | 16 |
| cross flow | — | — | 13 | — | — | — | — |
| Tensile Strength MPa | | | | | | | |
| in flow | 19 | 19 | 18 | 18 | 21 | 18 | 18 |
| cross flow | 18 | 18 | 18 | 16 | 19 | 16 | 17 |
| Elongation at break % | | | | | | | |
| in flow | 390 | 328 | 280 | 278 | 384 | 298 | 284 |
| cross flow | 440 | 320 | 300 | 292 | 344 | 292 | 292 |
| Tear Strength N/mm | | | | | | | |
| in flow | 101 | 109 | 118 | 106 | 120 | 100 | 101 |
| cross flow | 108 | 120 | 129 | 122 | 124 | 109 | 110 |
| PBT | 23.2 | 33.2 | 43.2 | 33.2 | 33.2 | 33.2 | 33.2 |
| PEE A | 29.9 | 24.9 | 19.9 | 24.9 | 49.8 | — | — |
| PEE B | — | — | — | 24.9 | — | 49.8 | — |
| PEE C | 29.9 | 24.9 | 19.9 | — | — | — | 49.8 |
| CB | 1.7 | 1.7 | 1.7 | 1.7 | 1.7 | 1.7 | 1.7 |
| Glass Fibre 2 | 15.0* | 15.0* | 15.0* | 15.0* | 15.0 | 15.0 | 15.0 |
| Irganox 1010 | 0.3 | 0.3 | 0.3 | 0.3 | 0.3 | 0.3 | 0.3 |
| PBT/PEE Ratio (excluding CB) | 28/72 | 40/60 | 52/48 | ← 40/60 → | | | |
| CEAST Impact Energy at −25 C. - J 3" × 4" × 3 mm plaques | | | | | | | |
| break | 42 | 41 | 43 | 38 | 44 | 41 | 23 |
| total | 44 | 44 | 46 | 42 | 47 | 44 | 30 |
| mode | d | d | d | d | d | d | b |
| Notched Izod J/m of specimen die-cut from 3" × 4" × 3 mm plaques | | | | | | | |
| at −23 C. | 440 p | 307 p | 278 p | 260 p | 398 p | 308 p | 292 p |
| at −10 C. | — | 378 p | 267 p | 318 p | 428 p | 336 p | 300 p |
| at −25 C. | 549 p | 272 p | 149 p | 271 p | 184 p | 237 p | 213 p |
| Dynstat - notched at −25 C. - KJ/m2 3" × 4" × 3 mm plaques | | | | | | | |
| in flow | nb | pb 26 | pb 19 | pb 26 | pb 26 | pb 28 | pb 26 |
| cross flow | nb | pb 24 | pb 15 | pb 24 | pb 21 | pb 23 | pb 22 |
| Dynstat - unnotched at −25 C. - KJ/m2 3" × 4" × 3 mm plaques | | | | | | | |
| in flow | nb | pb 36 | pb 26 | pb 30 | nb | pb 28 | pb 23 |
| cross flow | nb | nb | nb | nb | nb | nb | nb |
| CLTE × 10−6 mm/mm C. by TMA - RT to +100 C. - 3" × 4" × 3 mm plaques | | | | | | | |
| in flow x | 22 | 68 | 34 | 38 | 113 | 60 | 64 |
| cross flow x | 17 | 45 | 61 | 42 | 51 | 57 | 42 |

*different lot of OCF R08FX1 with L.O.I. of 0.55% rest of OCF R08FX1 used had L.O.I. of 0.65%
d = ductile; b = brittle; nb = no break; p, pb = partial break
x both values were determined on the same sample; before testing the sample was annealed for 1 hr at 120 C.

TABLE 5b

EXAMPLE 5

| RESIN No. | 31 | 32 | 33 | 34 |
|---|---|---|---|---|
| PBT | 21.8 | 20.4 | 21.8 | 20.4 |
| PEE A | 56.2 | 52.6 | 56.2 | 52.6 |
| CB | 1.7 | 1.7 | 1.7 | 1.7 |
| Glass Fibre 2 | 20.0 | 25.0 | — | — |
| Glass Fibre 1 | — | — | 20.0 | 25.0 |
| Irganox 1010 | 0.3 | 0.3 | 0.3 | 0.3 |
| PBT/PEE Ratio (excluding CB) | ←28/72→ | | | |
| Kayeness Melt viscosity at 250 C./Pas (pellets) | | | | |
| 55/s | 656 | 752 | 740 | 751 |
| 97/s | 495 | 576 | 542 | 540 |
| 555/s | 280 | 298 | 286 | 302 |
| 1000/s | 217 | 227 | 228 | 237 |
| 2777/s | 125 | 133 | 132 | 138 |
| ash % | 18.7 | 23.0 | 20.8 | 22.4 |
| Shrinkage % | | | | |
| in flow | 0.20 | 0.15 | 0.15 | 0.13 |
| cross flow | 0.47 | 0.45 | 0.47 | 0.51 |
| Test specimen die-cut from 3" × 4" × 3 mm plaques | | | | |
| Flex Modulus MPa | | | | |
| in flow | 1184 | 1551 | 1385 | 1411 |

TABLE 5b-continued

| | EXAMPLE 5 | | | |
|---|---|---|---|---|
| RESIN No. | 31 | 32 | 33 | 34 |
| cross flow | 548 | 589 | 554 | 595 |
| Yield Strength MPa | | | | |
| in flow | 16 | 16 | 28 | 29 |
| cross flow | 11 | 11 | 18 | 19 |
| Tensile Strength MPa | | | | |
| in flow | 18 | 16 | 10 | 12 |
| cross flow | 16 | 15 | 12 | 12 |
| Elongation at break % | | | | |
| in flow | 412 | 374 | 33 | 48 |
| cross flow | 400 | 390 | 72 | 62 |
| Tear Strength N/mm | | | | |
| in flow | 100 | 98 | 96 | 97 |
| cross flow | 106 | 105 | 126 | 121 |
| PBT | 21.8 | 20.4 | 21.8 | 20.4 |
| PEE A | 56.2 | 52.6 | 56.2 | 52.6 |
| CB | 1.7 | 1.7 | 1.7 | 1.7 |
| Glass Fibre 2 | 20.0 | 25.0 | — | — |
| Glass Fibre 1 | — | — | 20.0 | 25.0 |
| Irganox 1010 | 0.3 | 0.3 | 0.3 | 0.3 |
| PBT/PEE Ratio (excluding CB) | ← 28/72 → | | | |
| CEAST Impact Energy at −25 C. - J 3″ × 4″ × 3 mm plaques | | | | |
| break | 39 | 27 | 18 | 15 |
| total | 41 | 35 | 23 | 21 |
| mode | d | m | b | b |
| Notched Izod J/m of specimen die-cut from 3″ × 4″ × 3 mm plaques | | | | |
| at +23 C. | 296 p | 256 p | 398 p | 382 p |
| at −10 C. | 357 p | 235 p | 339 p | 333 p |
| at −25 C. | 359 p | 222 p | 305 p | 292 p |
| Dynstat - notched at −25 C. - KJ/m2 3″ × 4″ × 3 mm plaques | | | | |
| in flow | nb | pb 27 | pb 23 | pb 24 |
| cross flow | pb 24 | pb 23 | pb 23 | pb 28 |
| Dynstat - unnotched at −25 C. - KJ/m2 3″ × 4″ × 3 mm plaques | | | | |
| in flow | pb 27 | pb 24 | pb 35 | pb 33 |
| cross flow | nb | nb | nb | nb |
| CLTE × 10−6 mm/mm C. by TMA - RT to +100 C. - 3″ × 4″ × 3 mm plaques | | | | |
| in flow x | 40 | 20 | 31 | 26 |
| cross flow x | 42 | 28 | 34 | 33 | d = ductile; b = brittle; m = mixed; nb = no break; p, pb = partial break
x both values were determined on the same sample; before testing the sample was annealed for 1 hr at 120 C.

TABLE 6

| | EXAMPLE 6 | | | | | |
|---|---|---|---|---|---|---|
| RESIN No. | 35 | 36 | 37 | 38 | 39 | 40 |
| PBT | 37 | 37 | 19.5 | 23.4 | 27.3 | 31.2 |
| PEE A | 46 | 46 | 58.5 | 54.6 | 50.7 | 46.8 |
| CB | 1.7 | 1.7 | 1.7 | 1.7 | 1.7 | 1.7 |
| Glass Fibre 2 | 15 | — | 20 | 20 | 20 | 20 |
| Glass Fibre 1 | — | 15 | — | — | — | — |
| Irganox 1010 | 0.3 | 0.3 | 0.3 | 0.3 | 0.3 | 0.3 |
| PBT/PEE Ratio (excluding CB) | 45/55 | 45/55 | 25/75 | 30/70 | 35/65 | 40/60 |
| Kayeness Melt viscosity at 250 C./Pas (pellets) | | | | | | |
| 55/s | 517 | 535 | 607 | 614 | 617 | 603 |
| 97/s | 390 | 393 | 472 | 472 | 487 | 445 |
| 555/s | 240 | 244 | 270 | 268 | 273 | 269 |
| 1000/s | 191 | 197 | 208 | 210 | 214 | 205 |
| 2777/s | 119 | 120 | 118 | 127 | 122 | 127 |
| ash % | 14.1 | 14.2 | 17.7 | 18.9 | 19.1 | 19.2 |
| Shrinkage % 3″ × 4″ × 3 mm plaques | | | | | | |
| in flow | 0.30 | 0.30 | 0.20 | 0.20 | 0.20 | 0.20 |
| cross flow | 0.73 | 0.67 | 0.53 | 0.53 | 0.53 | 0.60 |
| Test specimen die-cut from 3″ × 4″ × 3 mm plaques | | | | | | |
| Flex Modulus MPa | | | | | | |
| in flow | 1424 | 1683 | 1298 | 1436 | 1641 | 1840 |
| cross flow | 636 | 703 | 492 | 586 | 560 | 703 |
| Tensile Strength MPA | | | | | | |
| in flow | 21 | 34 | 19 | 20 | 19 | 19 |
| cross flow | 17 | 19 | 16 | 15 | 15 | 15 |
| Elongation at break % | | | | | | |
| in flow | 326 | 10 | 463 | 447 | 380 | 319 |
| cross flow | 294 | 8 | 427 | 376 | 339 | 287 |
| Tear Strength N/mm | | | | | | |
| in flow | 125 | 145 | 91 | 95 | 100 | 108 |
| cross flow | 153 | 188 | 108 | 106 | 122 | 130 |
| PBT | 37 | 37 | 19.5 | 23.4 | 27.3 | 31.2 |
| PEE A | 46 | 46 | 58.5 | 54.6 | 50.7 | 46.8 |
| CB | 1.7 | 1.7 | 1.7 | 1.7 | 1.7 | 1.7 |
| Glass Fibre 2 | 15 | — | 20 | 20 | 20 | 20 |
| Glass Fibre 1 | — | 15 | — | — | — | — |
| Irganox 1010 | 0.3 | 0.3 | 0.3 | 0.3 | 0.3 | 0.3 |
| PBT/PEE Ratio (excluding CB) | 45/55 | 45/55 | 25/75 | 30/70 | 35/65 | 40/60 |
| CEAST Impact Energy at −25 C. - J 3″ × 4″ × 3 mm plaques | | | | | | |
| break | 38 | 13 | 36 | 36 | 34 | 33 |
| total | 43 | 16 | 39 | 40 | 38 | 38 |
| mode | d | b | d | d | d | d |
| Dynstat - notched at −25 C. - KJ/m2 3″ × 4″ × 3 mm plaques | | | | | | |
| in flow | pb 12 | pb 17 | hc 29 | pb 27 | hc 28 | pb 24 |
| cross flow | pb 15 | pb 21 | hc 25 | hc 22 | hc 22 | pb 17 |
| Dynstat - unnotched at −25 C. - KJ/m2 3″ × 4″ × 3 mm plaques | | | | | | |
| in flow | pb 26 | pb 26 | hc 40 | hc 34 | pb 27 | pb 29 |
| cross flow | nb | pb 35 | nb | nb | nb | nb |

TABLE 6-continued

EXAMPLE 6

| RESIN No. | 35 | 36 | 37 | 38 | 39 | 40 |
|---|---|---|---|---|---|---|
| CLTE × 10−6 mm/mm C. by TMA - RT to 100 C. - 3" × 4" × 3 mm plaques | | | | | | |
| in flow* | 29 | 12 | 58 | 26 | 42 | 47 |
| cross flow* | 59 | 59 | 38 | 54 | 41 | 35 | d = ductile; b = brittle;
*both values were determined on the same sample; before testing the sample was annealed for 1 hr at 120 C.

EXAMPLE 7

Resins were compounded which contained 15% glass fiber R08FXI or, respectively, 15% glass fiber R17BXI and base resins comprising, respectively:

| wt % PEE A | wt % PBT |
|---|---|
| 100% | 0% |
| 72% | 28% |
| 60% | 40% |
| 55% | 45% |
| 48% | 52% |
| 0% | 100% |

Figure 3B:
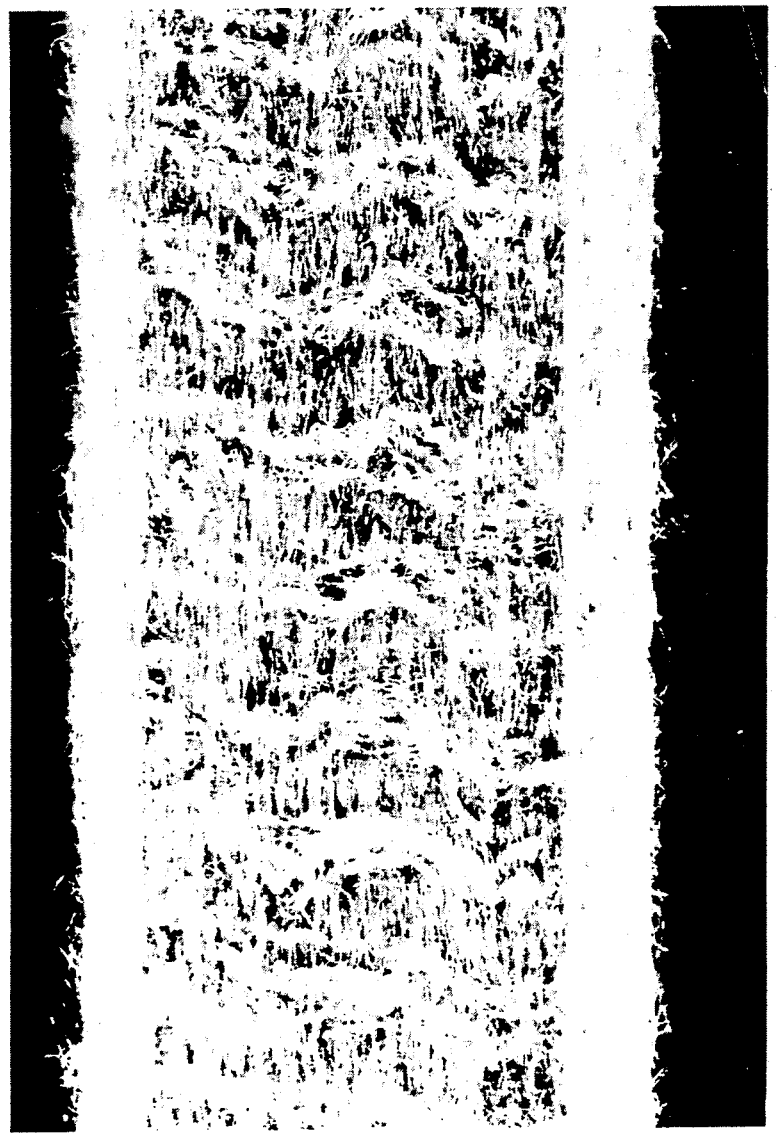
FIG. 3 is a graph showing the variation of elongation at break with PBT:PEE ratio of a substantially non-adhesive fiber-filled PEE/PBT blend of the invention and an adhesive fiber-filled PEE/PBT blend.
Figure 3:
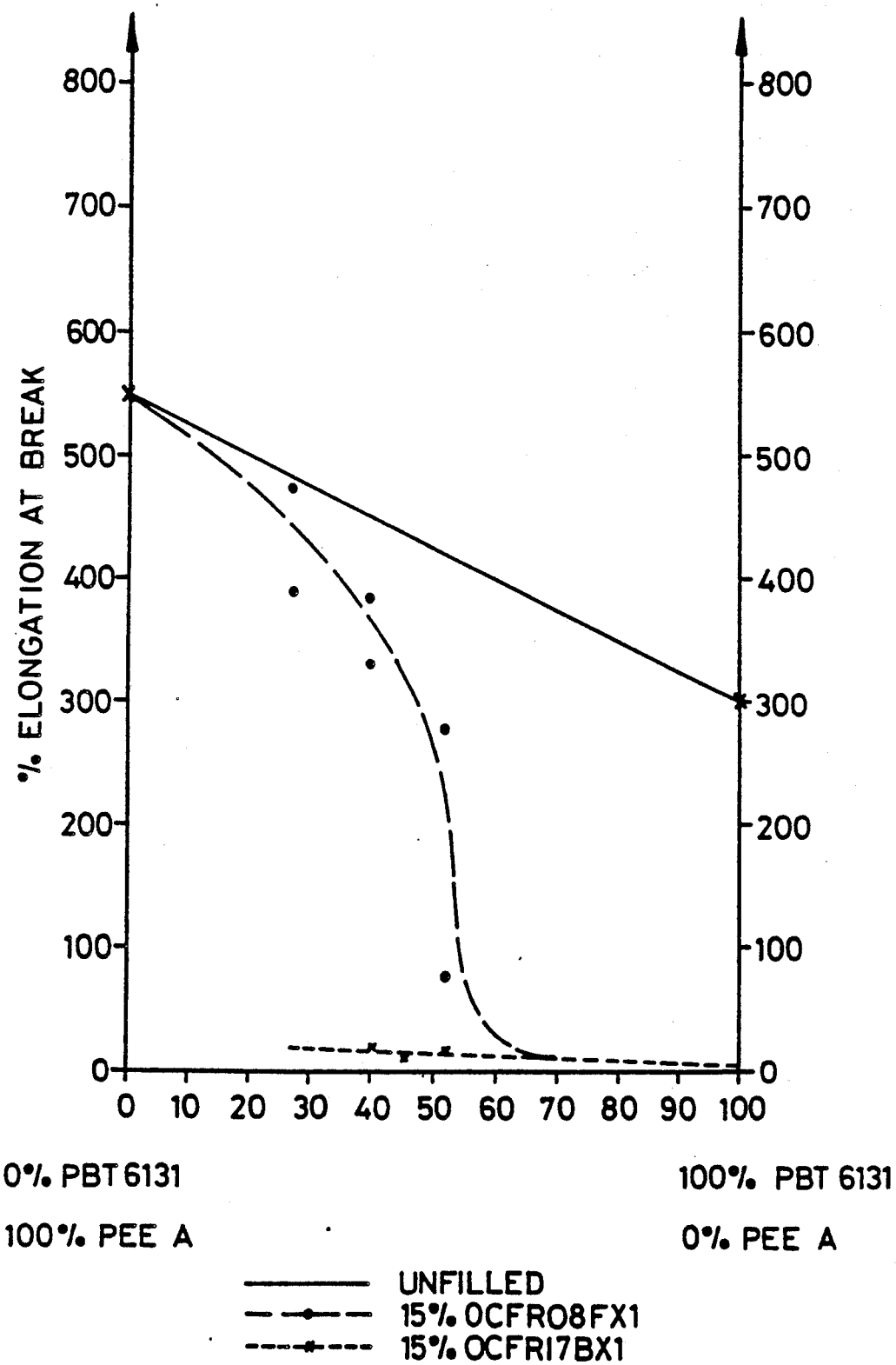
Figure 5:
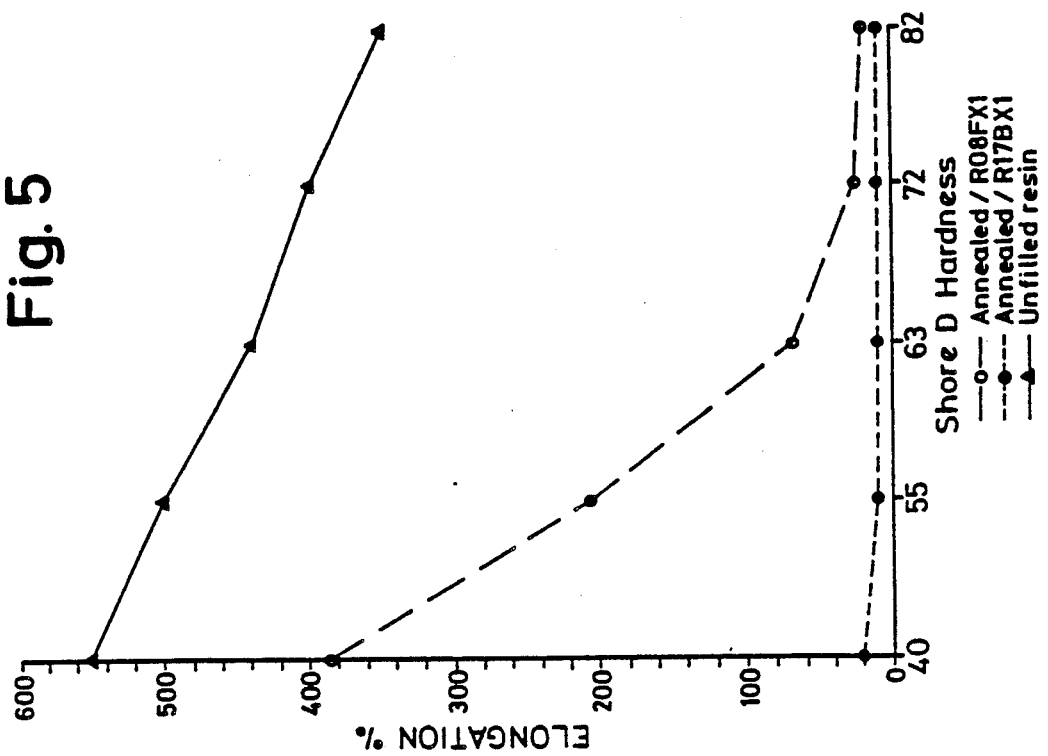
FIG. 5 is a graph showing the variation of elongation at break with polymer hardness of unfilled PEE, PEE filled with reinforcing fiber and PEE filled with non-reinforcing fiber.

The resins were moulded and their elongation at break measured, and the results are graphically displayed in FIG. 3. The area defined by the lines for the R08FXl-filled and R17BXI-filled resins may be said to represent where the invention lies, in this particular embodiment.

FIG. 3 and the data shown in Tables I to 6 indicate that PEE (or PEI) resins with a hardness of 40 D, containing 15–20% glass fiber and combined with PBT and R08FXI have critical PBT/PEE ratio of between 45:55 and 50:50 above which overall toughness, especially elongation at break, drops rapidly to the very low level of the corresponding R17BXI resin. As the amount of glass fiber is reduced, so the critical PBT/PEE ratio shifts to higher PBT levels.

EXAMPLE 8

Neat PBT, PEE A and PEE's with a hardness of 55 D, 63 D, 72 D and 82 D were single screw-compounded with 20% non-adhesive glass fiber R08FXI and 20% reinforcing glass fiber R17BXl. The resins were moulded and annealed for 1h at 120° C. The resins also all contain 1.7 wt % CB and 0.3% Irganox 1010. Some of the physical properties of the PEE resins were plotted versus Shore D hardness and the results are shown in FIGS. 4 to 9. The data points in these graphs are connected with curves just for easier comparability of the results.

Figure 4:
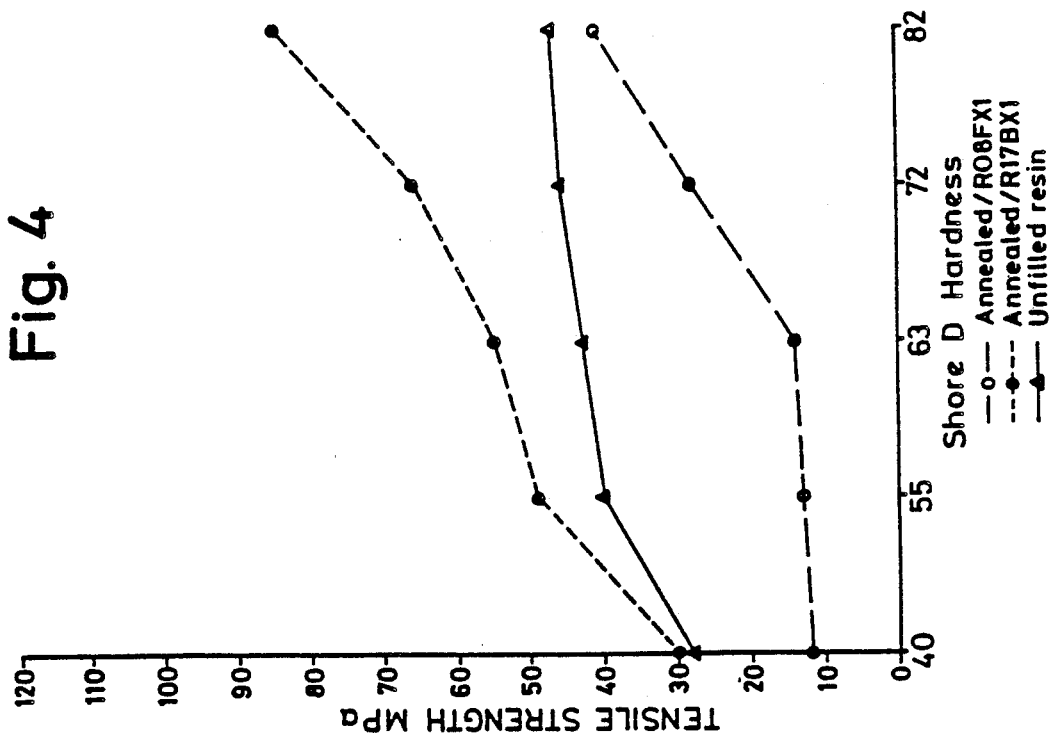
FIG. 4 is a graph showing the variation of tensile strength with polymer hardness of unfilled PEE, PEE filled with reinforcing fiber and PEE filled with non-reinforcing fiber.

FIGS. 4 to 9 show the following graphs:
FIG. 4: tensile strength versus polymer hardness
FIG. 5: elongation at break versus polymer hardness
FIG. 6: flex modulus versus polymer hardness
FIG. 7: tear strength versus polymer hardness
FIG. 8: rheometrics impact energy at 23° C. versus polymer hardness
FIG. 9: rheometrics impact energy versus temperature.

Tensile strength and elongation at break were determined using injection moulded ⅛ inch (3.175 mm) T-bars. Tear strength was determined using 3 inch×5 inch× 3 mm (7.6 cm×10.2 cm×3 mm) plaques, as was rheometrics impact strength. Unless otherwise indicated, all tests were performed at 23° C.

The following conclusions can be drawn from FIGS. 4 to 9:
1. Tensile strength is approximately twice as great for glass fiber R17BXI filled resins as for glass fiber R08FXI filled resins, and increases with increasing hardness.
2. Elongation at break of R08FXl-filled resins is increasingly superior with decreasing resin hardness.
3. Flex modulus of the two types of filled resins does not differ significantly.
4. Tear strength of the two types of resin is similar, except that the R08FXl-filled 63 D resin is significantly higher compared to the R17BXl-filled 63 D resin and the other R08FXI-filled resins.
5. Rheometrics impact strength at 5 mph (8 km/h) and 23° C. is superior for all R08FXl-filled resins. The 63 D resin requires the highest impact energy, correlating with the maximum tear strength. Further experiments (results not shown) demonstrated that the maximum shifts from 55 D to 40 D, respectively, as the temperature is reduced from −10° C. to −30° C.

EXAMPLE 9

The heat sag resistance and CLTE of the resins of Example 8 were tested and the results obtained are shown in Tables 7a–7c. The results show that the CLTEs of the glass fiber R08FXI filled resins are generally superior or at least comparable to those of the R17BXl-filled resins. Heat sag of the R08FXl-filled resins is excellent up to the measured 160° C. for all resins except those based on PEE A.

TABLE 7a

| Component | Sample No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| PBT | 78 | | | | | | 78 | | | | | |
| PEE A | | 78 | | | | | | 78 | | | | |
| 55 D PEE | | | 78 | | | | | | 78 | | | |
| 63 D PEE | | | | 78 | | | | | | 78 | | |
| 72 D PEE | | | | | 78 | | | | | | 78 | |
| 82 D PEE | | | | | | 78 | | | | | | 78 |
| CB | 1.7 | 1.7 | 1.7 | 1.7 | 1.7 | 1.7 | 1.7 | 1.7 | 1.7 | 1.7 | 1.7 | 1.7 |
| R08FX1 | 20 | 20 | 20 | 20 | 20 | 20 | | | | | | |
| R17BX1 | | | | | | | 20 | 20 | 20 | 20 | 20 | 20 |
| Ir 1010 | 0.3 | 0.3 | 0.3 | 0.3 | 0.3 | 0.3 | 0.3 | 0.3 | 0.3 | 0.3 | 0.3 | 0.3 |

TABLE 7b

CLTE × 10−6 mm/mm °C. by Dilatometer measured between room temperature and 80° C.; Annealed 1 hr/120° C.; ⅛" F-bar

| Sample No. | | | | | | | | | | | |
|---|---|---|---|---|---|---|---|---|---|---|---|
| 1 | 2 | 3 | 4 | 5 | 6 | 7 | 8 | 9 | 10 | 11 | 12 |
| 23 | 26 | 12 | 16 | 21 | 25 | 22 | 27 | 17 | 23 | 22 | 21 |

TABLE 7C

Heat sag (mm), bars equilibrated at 50% relative humidity, 6" (15.2 cm) overhand of sample, 1 h test duration

| Temp. | Sample No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 120° C. | 0.3 | — | 1.8 | 1.3 | 1.3 | 0.3 | 0.2 | 10.7 | 1.7 | 1.0 | 0.5 | 0.8 |
| 140° C. | 0.5 | — | 2.0 | 1.2 | 1.3 | 1.5 | 0.3 | 21.3 | 2.0 | 1.3 | 0.5 | 0.8 |
| 160° C. | 0.5 | — | 3.5 | 2.2 | 1.7 | 1.7 | 0.7 | — | 2.8 | 1.5 | 0.7 | 1.0 |

I claim:

1. A fiber-filled polyester resin, comprising:
    a polyetherester, a poly(etherimide)ester or a blend of both, or a blend of one or both of a polyetherester or a poly(etherimide)ester with a poly(butylene terephthalate) or poly(ethylene terephthalate) other than a blend having a matrix phase of poly(butylene terephthalate), poly(ethylene terephthalate) or both; and
    glass or mineral fibers that do not substantially adhere to the resin,
    the fiber-filled resin having an elongation at break when injection moulded substantially greater than that of the same resin when filled with reinforcing glass or mineral fiber that adhere to the resin.

2. A fiber-filled polyester resin of claim 1, wherein the percentage elongation at break is at least twice that of the same resin when filled only with reinforcing glass or mineral fiber that adhere to the resin.

3. A fiber-filled resin of claim 2, which has been injection moulded and has a flow direction and a cross flow direction and which has an elongation at break in the flow direction of at least 70%.

4. A fiber-filled polyester resin of claim 1, wherein the fibers are glass fibers.

5. A fiber-filled polyester resin of claim I, wherein the polyetherester or poly(etherimide)ester has a Shore D hardness of substantially no more than 75.

6. A fiber-filled resin of claim 1 wherein the resin comprises a blend containing poly(butylene terephthalate) and the weight ratio of poly(butylene terephthalate) and the weight ratio of poly(butylene terephthalate): polyetherester or poly(etherimide)ester is substantially no greater than 60:40.

7. A fiber-filled polyester resin of claim 1 wherein the glass or mineral fiber is present in an amount of from 10 to 25% by weight of the fiber-filled resin composition.

8. A fiber filled polyester resin of claim 1 wherein the polyetherester comprises a multiplicity of recurring intralinear long chain and short chain ester units interconnected head-to-tail through ester linkages, the long chain ester units being represented by at least one of the following structures:

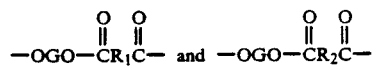

and the short chain ester units being represented by at least one of the following structures:

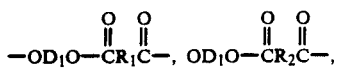

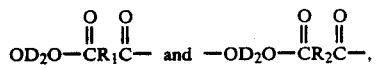

wherein:
    G is a divalent radical remaining after removal of terminal hydroxy groups from a long chain polymeric glycol having a molecular weight of above 400;
    $R_1$ and $R_2$ are different divalent radicals remaining after removal of carboxyl groups from a dicarboxylic acid having a molecular weight of less than 300; and
    $D_1$ and $D_2$ are different divalent radicals remaining after removal of hydroxyl groups from a low molecular weight diol having a molecular weight of less than 250.

9. A fiber-filled polyester resin of claim 8, wherein G is a divalent radical remaining after removal of terminal hydroxy groups from a poly(alkylene oxide)glycol having a molecular weight of no more than 6,000.

10. A fiber-filled polyester resin of claim 9, wherein the poly(alkylene oxide)glycol is poly(tetramethylene oxide)glycol, the dicarboxylic acid is terephthalic acid and optionally isophthalic acid or ester thereof in a proportion of less than 50 mol % of the amount of terephthalic acid, and the low molecular weight diol is 1,4-butanediol.

11. A fiber-filled polyester resin of claim 8, wherein the fibers are glass fibers.

12. A fiber-filled polyester resin of claim 11, wherein the glass fiber is present in an amount of from about 15 to 20% by weight of the fiber-filled resin composition.

13. A fiber-filled polyester resin of claim 12, wherein the polyetherester has a Shore D hardness not more than 55.

* * * * *